United States Patent
Yamaguchi et al.

(10) Patent No.: US 7,511,409 B2
(45) Date of Patent: Mar. 31, 2009

(54) DIELECTRIC FILM ELEMENT AND COMPOSITION

(75) Inventors: Hirofumi Yamaguchi, Komaki (JP); Kei Sato, Tokai (JP); Toshikatsu Kashiwaya, Inazawa (JP)

(73) Assignee: NGK Insulators, Ltd., Nagoya (JP)

( * ) Notice: Subject to any disclaimer, the term of this patent is extended or adjusted under 35 U.S.C. 154(b) by 633 days.

(21) Appl. No.: 11/210,279

(22) Filed: Aug. 23, 2005

(65) Prior Publication Data

US 2006/0043863 A1    Mar. 2, 2006

Related U.S. Application Data

(60) Provisional application No. 60/611,924, filed on Sep. 22, 2004, provisional application No. 60/611,926, filed on Sep. 22, 2004.

(30) Foreign Application Priority Data

Aug. 25, 2004  (JP)  .............................. 2004-245833
Jul. 19, 2005   (JP)  .............................. 2005-208337

(51) Int. Cl.
    *H01J 1/14*   (2006.01)
    *H01J 1/05*   (2006.01)
(52) U.S. Cl. ................. 313/311; 252/62.9 PZ; 310/311
(58) Field of Classification Search ......... 313/309–311, 313/351, 336, 495, 496, 391; 501/135, 136; 252/62.9 PZ; 310/311

See application file for complete search history.

(56) References Cited

U.S. PATENT DOCUMENTS

| 5,952,772 | A  | 9/1999  | Fox et al. |
| 2002/0153827 | A1 | 10/2002 | Takeuchi et al. |
| 2003/0076023 | A1 | 4/2003  | Komoda et al. |
| 2004/0090398 | A1 | 5/2004  | Takeuchi et al. |

FOREIGN PATENT DOCUMENTS

| DE | 198 02 435 A1 | 8/1998 |
| EP | 0 331 160 A | 9/1989 |
| EP | 1403897 | 3/2004 |
| EP | 1 418 609 A2 | 5/2004 |

(Continued)

OTHER PUBLICATIONS

Yasuoka and Ishii, "kyoyudentai inkyoku wo mochiita parusu denshigen (Pulsed electron sources with ferroelectric cathodes)", Oyobutsuri vol. 68, No. 5, pp. 546 to 550 (1999).

(Continued)

*Primary Examiner*—Joseph L Williams
*Assistant Examiner*—Elmito Breval
(74) *Attorney, Agent, or Firm*—Burr & Brown

(57) ABSTRACT

Provided is a piezoelectric-film-type electron emitter which enables suppression of reduction of electron emission quantity due to repeated use thereof, and which exhibits high durability. The electron emitter includes a substrate; an emitter section formed of a dielectric material; a first electrode formed on the top surface of the emitter section; and a second electrode formed on the bottom surface of the emitter section. The dielectric material forming the emitter section contains a dielectric composition having an electric-field-induced strain (i.e., percent deformation under application of an electric field of 4 kV/mm, as measured in a direction perpendicular to the electric field) of 0.07% or less.

49 Claims, 6 Drawing Sheets

FOREIGN PATENT DOCUMENTS

| | | |
|---|---|---|
| JP | 42-9716 | 5/1967 |
| JP | 44-17103 | 7/1969 |
| JP | 44-26125 | 11/1969 |
| JP | 45-8145 | 3/1970 |
| JP | 45-30151 | 9/1970 |
| JP | 46-20944 | 6/1971 |
| JP | 7-147131 | 6/1995 |
| JP | 09-045226 A1 | 2/1997 |
| JP | 2654571 | 5/1997 |
| JP | 10-139594 A1 | 5/1998 |
| JP | 2000-178068 | 6/2000 |
| JP | 2000-285801 | 10/2000 |
| JP | 3295871 | 4/2002 |
| JP | 2004-146365 | 5/2004 |
| JP | 2004-172087 | 6/2004 |

OTHER PUBLICATIONS

V.F. Puchkarev, G.A. Mesyats "On the mechanism of emission from the ferroelectric ceramic cathode," J. Appl. Phys., vol. 78, No. 9, Nov. 1, 1995, pp. 5633-5637.

H. Riege, "Electron emission ferroelectrics—a review," Nucl. Instr. And Mech., A340, pp. 80-89, 1994.

(A)

(B)

(C)

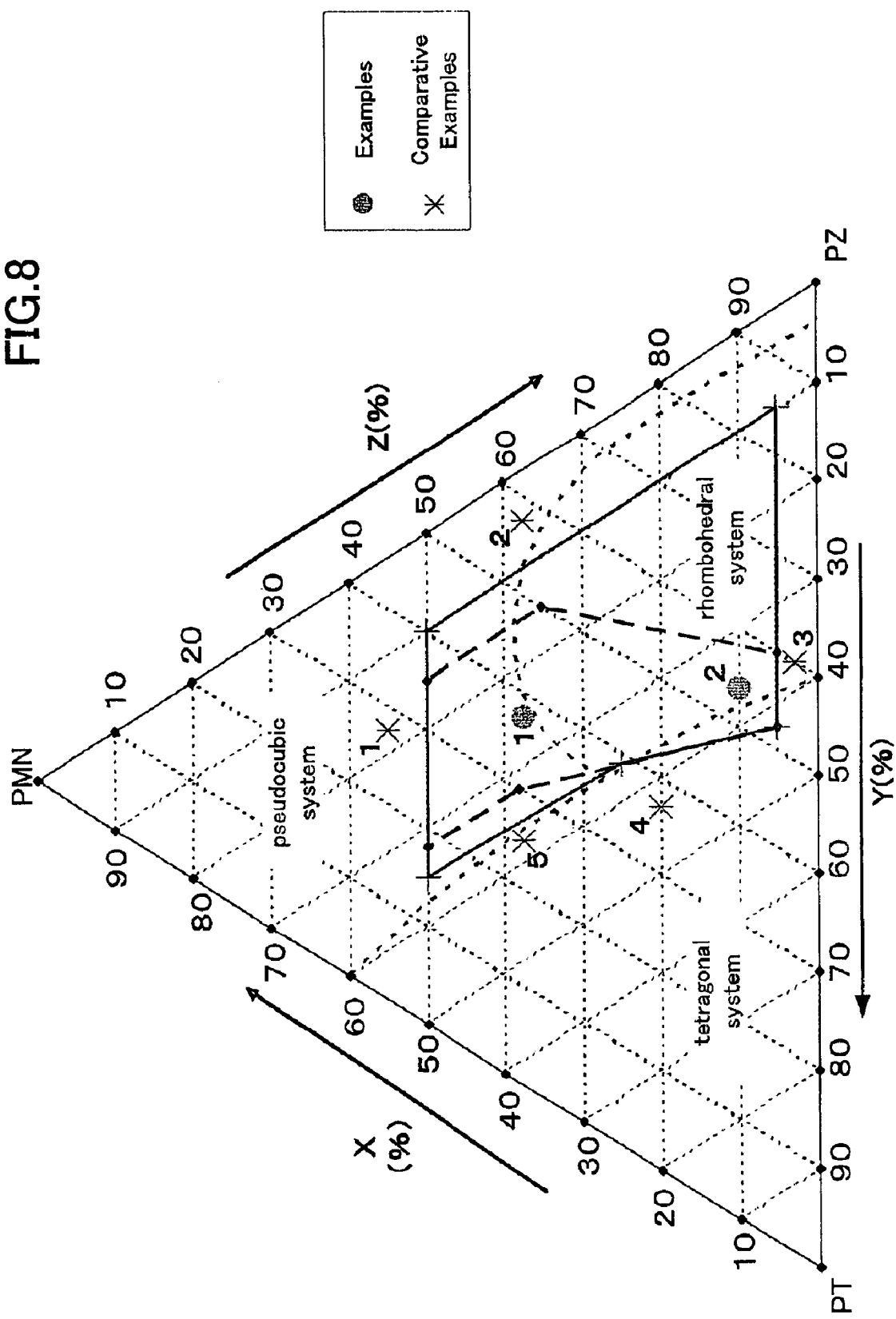

DIELECTRIC FILM ELEMENT AND COMPOSITION

BACKGROUND OF THE INVENTION

1. Field of the Invention

The present invention relates to an electron emitter applicable to electron beam sources for use in various devices and apparatus that utilize electron beams, such as displays (e.g., field emission display (FEDs)), electron beam irradiation apparatus, light sources, electronic-component-manufacturing apparatus, and electronic circuit components.

2. Description of the Related Art

As is generally known, the aforementioned electron emitter is configured such that a predetermined electric field is applied to an emitter section (electron emission section) in a vacuum having a predetermined vacuum level, whereby electrons are emitted from the emitter section. In application to an FED, a plurality of electron emitters are two-dimensionally arrayed on a substrate formed of, for example, glass or ceramic material. In addition, a plurality of phosphors corresponding to the electron emitters are arrayed with a predetermined gap therebetween. Among the two-dimensionally arrayed electron emitters, certain electron emitters are selectively driven so as to emit electrons therefrom. The emitted electrons fly through the aforementioned gap and collide with phosphors corresponding to the driven electron emitters. The phosphors hit by the electrons fluoresce, thereby displaying a desired image.

Conventionally known electron emitters include an electron emitter having an emitter section formed of a dielectric material (piezoelectric material). Such an electron emitter is called a "piezoelectric-film-type electron emitter." This type of electron emitter is produced at low cost, and therefore is suitable for use in an FED, in which, as described above, numerous electron emitters are two-dimensionally arrayed on a substrate having a relatively large area. Conventional piezoelectric-film-type electron emitters are disclosed in, for example, Japanese Patent Application Laid-Open (kokai) Nos. 2004-146365 and 2004-172087.

Such a conventional piezoelectric-film-type electron emitter is configured such that a cathode electrode covers a portion of the top surface of an emitter section formed of a dielectric material, and an anode electrode is provided on the bottom surface of the emitter section, or on the top surface of the emitter section at a position a predetermined distance away from the cathode electrode. Specifically, the electron emitter is configured such that an exposed portion of the top surface of the emitter section at which neither the cathode electrode nor the anode electrode is formed is present in the vicinity of a peripheral edge portion of the cathode electrode (the exposed portion plays an important role for electron emission in the emitter section, and this portion will be called an "electron emission region").

The conventional electron emitter is operated as follows. In the first stage, voltage is applied between the cathode electrode and the anode electrode such that the cathode electrode is higher in electric potential. An electric field induced by the applied voltage brings the electron emission region of the emitter section into a predetermined polarization state. In the second stage, voltage is applied between the cathode electrode and the anode electrode such that the cathode electrode is lower in electric potential. At this time, primary electrons are emitted from the peripheral edge portion of the cathode electrode, and the polarization of the emitter section is inverted. The primary electrons collide with the electron emission region of the polarization-inverted emitter section, whereby secondary electrons are emitted from the electron emission region. The secondary electrons fly in a predetermined direction by means of an externally applied, predetermined electric field; i.e., the electron emitter emits electrons.

SUMMARY OF THE INVENTION

However, such a conventional piezoelectric-film-type electron emitter involves a problem in that the electron emission quantity is considerably reduced due to repeated use thereof. Among components of the electron emitter (i.e., an emitter section, electrodes, and a substrate), the emitter section generally undergoes change in characteristics, due to repeated use of the electron emitter. Therefore, reduction of the electron emission quantity is considered to be caused mainly by deterioration of the emitter section due to repeated use of the electron emitter.

Here, the emitter section of such a conventional piezoelectric-film-type electron emitter has generally been formed from a piezoelectric material which is applied to a piezoelectric actuator of an inkjet printer, etc., or from a piezoelectric material for producing a ferroelectric memory. The former piezoelectric material (for piezoelectric actuator) is generally a PMN (lead magnesium niobate)-PZ (lead zirconate)-PT (lead titanate) ternary solid solution material having a composition in the vicinity of the morphotropic phase boundary (MPB) defined by a tetragonal region, a pseudocubic region, and a rhombohedral region. Meanwhile, the latter piezoelectric material (for ferroelectric memory) is generally a PZT material (i.e., a material having a composition on the line formed by connecting the PT vertex (0, 1, 0) and the PZ vertex (0, 0, 1) of a PMN-PZ-PT ternary solid solution diagram, or a composition in the vicinity of the line) in which the PT content is about 55% or more.

However, the operation principle of a piezoelectric actuator originally differs from that of an electron emitter, and therefore, the mechanism of deterioration of the piezoelectric material due to repeated use of the piezoelectric actuator differs from that in the case of the electron emitter. Specifically, in the case of an electron emitter, the inversion of polarization in a piezoelectric material causes electrons to be emitted from the surface of the piezoelectric material. Meanwhile, in the case of a piezoelectric actuator, a piezoelectric material is polarized in a predetermined direction through a predetermined polarization treatment, and the thus-polarized piezoelectric material is expanded/shrunk or sheared through application of an electric field in a direction parallel or perpendicular to the predetermined polarization direction. Therefore, a piezoelectric material for a piezoelectric actuator is designed without taking into consideration the inversion of polarization in the piezoelectric material. That is, a piezoelectric material for a piezoelectric actuator is designed without taking into consideration the deterioration of characteristics of the material due to a large number of polarization inversion cycles.

In the meantime, the operation principle of a ferroelectric memory is similar to that of an electron emitter in that the inversion of polarization in a piezoelectric material is utilized. However, $SrBi_2Ta_2O_9$ (SBT) or $Bi_4Ti_3O_{12}$ (BIT), which is a piezoelectric material for a terroelectric memory and is known to have high durability, is not suitable for use in an FED, since such a piezoelectric material exhibits low residual polarization (Pr), and thus emits only a small number of electrons. Meanwhile, a PZT material containing PT in an amount of about 55% or more exhibits poor durability, and thus undergoes significant deterioration during the course of $10^6$ to $10^7$ polarization inversion cycles.

As described above, in conventional piezoelectric-film-type electron emitters, no attempts have been made to determine the material of an emitter section appropriate for attaining satisfactory durability.

The present invention has been accomplished in view of the above-described problems, and an object of the present invention is to provide a piezoelectric-film-type electron emitter which enables suppression of reduction of electron emission quantity due to repeated use thereof.

The electron emitter of the present invention comprises an emitter section formed of a dielectric material; electrodes formed on one or more surfaces of the emitter section; and a substrate which supports the emitter section and the electrodes.

A characteristic feature of the electron emitter of the present invention resides in that the dielectric material constituting the emitter section has an electric-field-induced strain of 0.07% or less. As used herein, the term "electric-field-induced strain" refers to percent deformation under application of an electric field of 4 kV/mm, as measured in a direction perpendicular to the electric field.

That is, the piezoelectric material is at high temperature and its crystal structure is in the cubic system in process of forming a dielectric layer which comprises the emitter section (e.g. in process of sintering). On the contrary, the crystal structure is transformed into the tetragonal system during the course of cooling, at the Curie point. During this phase transformation, numerous microscopic domains (i.e., the regions which direction of polarization are uniform) are formed in the interior of the piezoelectric material. When the domains are formed, deformation of crystal lattice is limited (restricted) at the boundary of neighboring domains, so the lattice constant corresponding to the cubic crystal phase fails to be changed into the lattice constant corresponding to the tetragonal crystal phase, which is a stable crystal phase. Thus, the crystal lattices in the domains are strained in a predetermined direction different from the direction corresponding to the stable crystal phase. Hereby significant residual stress is generated in the emitter section just after forming the emitter section (i.e. just after forming the electron emitter).

Thereafter, when an alternating electric field (i.e. an electric field by driving voltage) is applied to the emitter section and the inversion or rotation of the polarization is repeated, an alternating stress mainly generated from the rotation of the polarization would come into existence inside of the emitter section which is in concert with the alternating electric field by the electromechanical transduction effect of the application of the electric field. Generation of the alternating stress in the emitter section causes rearrangement of the domains for reducing the residual stress; i.e., the arrangement of the domains is changed from the domain arrangement observed immediately after production of the electron emitter.

Especially, the above-mentioned residual stress becomes significant in the case that the emitter section is comprised of the material which above-mentioned electric-field-induced strain is high. Thus, in this case, the transformation of the arrangement of the domain (rearrangement of the domain) would be more facilitated.

Also, in the case that the emitter section is formed and firmly fixed on or above the substrate (i.e. directly or via a predetermined electrode layer: the same shall apply thereinafter.), the deformation of the emitter section is limited (restricted) by the substrate (or the electrode layer) at the fixing portion of the substrate and the emitter section. Thus, the extent of generation of the stress caused by the above-mentioned alternating electric field at the emitter section (especially at the electron emission region of the top surface of the emitter section which is on the reverse side of the above-mentioned fixing portion) becomes larger than the case that the emitter section has no configurational restrain. Consequently, in that case, the above-mentioned rearrangement of the domains would be more facilitated.

That kind of rearrangement of the domains, that is, the change of the state of the domain, in a manner that the residual stress generated at the time of forming the emitter section would be reduced, by applying the alternating electric field (and by occurring the alternating stress originated from the alternating electric field), is assumed to be significantly relevant to the decrease of the amount of the electron emission due to repeated use.

Therefore, in the present invention, the emitter section is comprised of a dielectric material which primary component is a dielectric composition which electric-field-induced strain is low. Thus, the stress becomes lower which is generated at the time of rotation of the polarization. Then, the residual stress generated at the time of forming the emitter section may be less reduced, and the rearrangement of the domain (the change of the state of the domain) may be less occurred, due to repeated use. Consequently, the decrease of the amount of the electron emission is inhibited due to repeated use. That is, the durability of the emitter section may become enhanced.

Preferably, the dielectric material is formed of any of the below-described first to sixth dielectric compositions.

A first dielectric composition contains, as a primary component, a composition represented by the following formula (1), and contains Ni, wherein the Ni content of the dielectric composition is 0.05 to 2.0 wt. % as reduced to NiO.

$$Pb_xBi_p(Mg_{y/3}Nb_{2/3})_aTi_{b-z}M_zZr_cO_3 \quad (1)$$

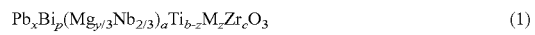

[wherein x, p, and y satisfy the following relations: $0.85 \leq x \leq 1.03$, $0.02 \leq p \leq 0.1$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W].

Preferably, the first dielectric composition contains, as a primary component, a composition represented by the following formula (1'):

$$Pb_x(Mg_{y/3}Nb_{2/3})_aTi_bZr_cO_3 \quad (1')$$

[wherein x and y satisfy the following relations $0.95 \leq x \leq 1.05$ and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1)], wherein 2 to 10 mol % of Pb is substituted by Bi, 2 to 10 mol % of Ti is substituted by at least one element selected from among Nb, Ta, Mo, and W, and the NiO content is 0.05 to 2.0 wt. % on the basis of the entirety of the dielectric composition.

The aforementioned dielectric composition can be prepared through, for example, the following procedure: firstly, oxides, carbonates, etc. of elements (e.g., Pb, Mg, Nb, Ti, Zr, Ni, Bi, and Ta) are mixed such that the mole fractions of the elements fall within the above-described ranges, to thereby prepare a mixture; subsequently, the mixture is placed in a hermetic container, and then heated at a predetermined temperature; and the thus-heated product is milled so as to form particles having a predetermined particle size.

A dielectric layer is formed from the thus-prepared dielectric composition through a generally employed production process (e.g., screen printing, dipping, coating, electrophoresis, aerosol deposition, the ion beam process, sputtering, vacuum evaporation, ion plating, chemical vapor deposition (CVD), plating, and the green sheet process), whereby the emitter section of the electron emitter of the present invention is formed. Further, by processing heating or sintering to the dielectric layer which is thus obtained, it is preferable to improve the electric feature of the dielectric layer or make it dense.

A second dielectric composition contains, as a primary component, a composition represented by the following formula (2), and contains Ni, wherein the Ni content of the dielectric composition is 0.05 to 2.0 wt. % as reduced to NiO.

$$Pb_xBi_pSr_q(Mg_{y/3}Nb_{2/3})_aTi_{b-z}M_zZr_cO_3 \quad (2)$$

[wherein x, p, q, and y satisfy the following relations: $0.65 \leq x \leq 1.01$, $0.02 \leq p \leq 0.1$, $0.02 \leq q \leq 0.20$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$: and M is at least one element selected from among Nb, Ta, Mo, and W].

Preferably, the second dielectric composition contains, as a primary component, a composition represented by formula (1'), wherein 2 to 10 mol % of Pb is substituted by Bi, 2 to 20 mol % of Pb is substituted by Sr, 2 to 10 mol % of Ti is substituted by at least one element selected from among Nb, Ta, Mo, and W, and the NiO content is 0.05 to 2.0 wt. % on the basis of the entirety of the dielectric composition. The second dielectric composition can be prepared in a manner similar to that of the first dielectric composition.

Preferably, the first or second dielectric composition contains Mn in an amount of 0.05 to 1.0 wt. % as reduced to $MnO_2$.

The amount of Pb to be substituted by Bi is more preferably 2 to 5 mol % (i.e., x and p in formula (1) satisfy the following relations: $0.90 \leq x \leq 1.03$ and $0.02 \leq p \leq 0.05$). The amount of Pb to be substituted by Sr is more preferably 1 to 15 mol % (i.e., x and p in formula (2) satisfy the following relations: $0.70 \leq x \leq 1.02$ and $0.02 \leq p \leq 0.10$ (more preferably $0.75 \leq x \leq 1.02$ and $0.02 \leq p \leq 0.05$), and q in formula (2) satisfies the following relation: $0.01 \leq q \leq 0.15$). Much more preferably, the amount of Pb to be substituted by Sr is 1 to 12 mol % (i.e., x and p in formula (2) satisfy the following relations: $0.73 \leq x \leq 1.02$ and $0.02 \leq p \leq 0.10$ (more preferably $0.78 \leq x \leq 1.02$ and $0.02 \leq p \leq 0.05$), and q in formula (2) satisfies the following relation: $0.01 \leq q \leq 0.12$). The amount of Ti to be substituted by Nb, etc. is more preferably in the range from 3 to 8 mol % (i.e., z in formula (1) or (2) satisfies the following relation: $0.03 \leq z \leq 0.08$). The Ni content is more preferably in the range from 0.10 to 1.5 wt. % as reduced to NiO. The range from 0.20 to 1.0 wt. % is much more preferable. The Mn content is more preferably in the range from 0.1 to 1.0 wt. % as reduced to $MnO_2$. The range from 0.2 to 0.8 wt. % is much more preferable.

The electron emitter of the present invention, which has the aforementioned configuration, exhibits improved deterioration due to repeated use thereof, as compared with the case of a conventional electron emitter. That is, the electron emitter of the present invention exhibits enhanced durability.

A third dielectric composition contains, as a primary component, a dielectric composition represented by the following formula (3):

$$Pb_x(Mg_{y/3}Nb_{2/3})_aTi_bZr_cO_3 \quad (3)$$

[wherein x and y satisfy the following relations: $0.95 \leq x \leq 1.05$ and $0.90 \leq y \leq 1.10$; and a, b, and c are decimal numbers falling within a region formed by connecting the following five points (0.500, 0.350, 0.150), (0.500, 0.100, 0.400), (0.050, 0.100, 0.850), (0.050, 0.425, 0.525), and (0.250, 0.360, 0.390) in a triangular coordinate system of (a, b, c) having the following three vertexes (1, 0, 0), (0, 1, 0), and (0, 0, 1)].

A fourth dielectric composition contains, as a primary component, a dielectric composition represented by the following formula (4):

$$Pb_{x-p}Ma_p(Mg_{y/3}Nb_{2/3})_aTi_bZr_cO_3 \quad (4)$$

[wherein x, y, a, b, and c fall within ranges corresponding to those of x, y, a, b, and c in formula (3); and Ma is at least one element selected from among Sr, La, and Bi].

A fifth dielectric composition contains, as a primary component, a dielectric composition represented by the following formula (5):

$$Pb_x(Mg_{y/3}Nb_{2/3})_aTi_{b-q}Mb_qZr_cO_3 \quad (5)$$

[wherein x, y, a, b, and c fall within ranges corresponding to those of x, y, a, b, and c in formula (3); and Mb is at least one element selected from among Nb, Ta, Mo, and W].

A sixth dielectric composition contains, as a primary component, a dielectric composition represented by the following formula (6):

$$Pb_{x-p}Ma_p(Mg_{y/3}Nb_{2/3})_aTi_{b-q}Mb_qZr_cO_3 \quad (6)$$

[wherein x, y, a, b, and c fall within ranges corresponding to those of x, y, a, b, and c in formula (3); and Ma and Mb have the same meanings as those described above in formulas (4) and (5)].

That is, each of the fourth to sixth dielectric compositions contains, as a primary component, a dielectric composition represented by formula (3), wherein Pb is partially substituted by at least one element selected from among Sr, La, and Bi, and/or Ti is partially substituted by at least one element selected from among Nb, Ta, Mo, and W. It becomes possible to improve the durability and amount of the electron emission by substituting Pb partially by Sr, because the electric-field-induced strain becomes less and a drop of residual polarization (Pr) is low. Also, the B-site of the perovskite is partially substituted by La, Bi, Nb, W, Mo, Ta, etc. then valence of the substituted portion becomes bigger than quadrivalent which is the average valence of the B-site and then a hole is generated so as to compensate that. As a result, the durability is enhanced because the hole prevents the domain from rotating.

In the electron emitter of the present invention, which has the aforementioned configuration, the electrodes formed on the surface(s) of the emitter section are electrically connected to a drive voltage generator for generating an electric field to be applied to the emitter section (in particular, in the vicinity of the electron emission region of the top surface of the emitter section), in order to emit electrons from the top surface of the emitter section (particularly from the electron emission region). Specifically, for example, a first electrode is formed on the top surface of the emitter section, a second electrode is formed on the top surface or the bottom surface of the emitter section, and the first and second electrodes are connected to the output terminal of a drive voltage generator (in many cases, the second electrode is grounded). When a drive voltage is applied to these electrodes, a predetermined electric field is applied to the emitter section (particularly to the electron emission region of the top surface thereof), the emitter section being formed of the dielectric material predominantly containing the aforementioned dielectric composition, whereby electrons are emitted from the electron emission region.

Here, from the viewpoint of enhancement of durability, a, b, and c in formulas (3) through (6) preferably fall within a region formed by connecting the following six points (0.500, 0.320, 0.180), (0.500, 0.100, 0.400), (0.300, 0.100, 0.600), (0.050, 0.225, 0.725), (0.050, 0.425, 0.525) and (0.380, 0.320, 0.300) of the aforementioned triangular coordinate system, more preferably within a region formed by connecting the following six points (0.500, 0.320, 0.180), (0.500, 0.150, 0.350), (0.350, 0.150, 0.500), (0.050, 0.350, 0.600), (0.050, 0.425, 0.525), and (0.380, 0.320, 0.300) of the triangular coordinate system.

The value p(Sr) (i.e., the value p when Ma in formulas (4) and (6) is Sr) preferably falls within a range of 0.03 to 0.15, more preferably 0.03 to 0.10, much more preferably 0.05 to 0.07.

The value p(La+Bi) (i.e., the value p when Ma in formulas (4) and (6) is La and/or Bi) preferably falls within a range of 0.002 to 0.015, more preferably 0.003 to 0.010, much more preferably 0.005 to 0.009.

Most preferably, both Sr and La are contained so as to attain mole fractions of 0.05 to 0.07 and 0.005 to 0.009, respectively.

In formulas (5) and (6), the value q preferably falls within a range of 0.01 to 0.15, more preferably 0.02 to 0.10, most preferably 0.02 to 0.08.

Each of the third to sixth dielectric compositions can be prepared in a manner similar to that of the aforementioned first or second dielectric composition. The emitter section of the electron emitter is formed from the thus-prepared dielectric composition in a manner similar to that described above.

The aforementioned dielectric material preferably has, as a primary crystal phase, a pseudocubic crystal phase or a rhombohedral crystal phase. Meanwhile, as mentioned above, the dielectric material has an electric-field-induced strain (i.e., percent deformation under application of an electric field of 4 kV/mm, as measured in a direction perpendicular to the electric field) of 0.07% or less.

That is, as mentioned above, the piezoelectric material is at high temperature and its crystal structure is in the cubic system in process of forming a dielectric layer which comprises the emitter section. On the contrary, the crystal structure is transformed into the tetragonal system during the course of cooling. During this phase transformation, numerous microscopic domains are formed in the interior of the piezoelectric material. When the domains are formed, deformation of crystal lattice is limited (restricted) at the boundary of neighboring domains, and the lattice constant corresponding to the cubic crystal phase fails to be changed into the lattice constant corresponding to the tetragonal crystal phase, which is a stable crystal phase. That is, the crystal lattices in the domains are strained in a predetermined direction different from the direction corresponding to the stable crystal phase. Hereby significant residual stress is generated in the emitter section just after forming the emitter section (i.e. just after forming the electron emitter).

Thereafter, when an alternating electric field is applied to the emitter section and the inversion or rotation of the polarization is repeated, an alternating stress mainly generated from the rotation of the polarization would come into existence inside of the emitter section which is in concert with the alternating electric field by the electromechanical transduction effect of the application of the electric field. Generation of the alternating stress in the emitter section causes rearrangement of the domains for reducing the residual stress; i.e., the arrangement of the domains is changed from the domain arrangement observed immediately after production of the electron emitter.

Particularly when the emitter section is bonded on or above the substrate, deformation of the emitter section is limited (restricted) at the bonding portion between the substrate and the emitter section by means of the substrate (or the aforementioned electrode layer). Therefore, the amount of stress generated in the emitter section (particularly in the electron emission region on the top surface of the emitter section opposite the surface facing the bonding portion) through application of the aforementioned alternating electric field becomes larger than in the case where deformation of the emitter section is not restricted. Therefore, when the emitter section is bonded onto the substrate, rearrangement of the domains in the emitter section is further promoted.

Conceivably, such domain rearrangement (i.e., change in the state of the domains in the emitter section) for reducing the residual stress generated during formation of the emitter section—which rearrangement occurs through application of the alternating electric field (and through generation of the alternating stress by the electric field application)—is closely related to reduction of electron emission quantity (i.e., deterioration of the emitter section) due to repeated use of the electron emitter.

In the present invention, preferably, the emitter section is formed from a dielectric material which predominantly contains any of the aforementioned third to sixth dielectric compositions, and which has, as a primary crystal phase, a pseudocubic crystal phase or a rhombohedral crystal phase. With this constitution, the amount of stress generated by the lattice constant ratio (c/a) during the rotation of polarization becomes small. Therefore, there is improved reduction of the residual stress generated during formation of the emitter section, as well as rearrangement of the domains in the emitter section (change in the state of the domains), which reduction or rearrangement would occur due to repeated use of the electron emitter. Thus, the durability of the emitter section is enhanced.

Preferably, the emitter section is bonded onto the surface of the aforementioned substrate. More preferably, the emitter section has a first electrode provided on the top surface thereof, and a second electrode provided on the bottom surface thereof, wherein the second electrode is bonded onto the surface of the substrate, and the emitter section is bonded onto the second electrode.

Specifically, in this preferred configuration, the second electrode is bonded onto the surface of the substrate; the emitter section is bonded onto the second electrode; and the first electrode is bonded onto the top surface of the emitter section. With this configuration, the area of the substrate required for forming a single electron emitter can be reduced, and the mounting density of electron emitters on the substrate can be increased, as compared with the case where both the first and second electrodes are provided on the top surface of the emitter section. Therefore, particularly when the electron emitter is applied to an FED, high resolution is readily attained. In this configuration, the first electrode and the second electrode are respectively provided on different surfaces (the top surface and the bottom surface) of the dielectric layer constituting the emitter section; i.e., the dielectric layer is provided between the first and second electrodes. Therefore, a higher voltage can be applied to these electrodes, as compared with the case where both the electrodes are provided on the top surface of the emitter section. Thus, the electron emitter exhibits enhanced durability and increased electron emission quantity.

When the emitter section is bonded onto the substrate, preferably, the thermal expansion coefficient of the substrate is greater than that of the dielectric layer constituting the emitter section.

During the course of formation of the dielectric layer through sintering or a similar technique (i.e., during the course of densification of the dielectric layer at a high temperature), no particular generation of stress is observed in the dielectric layer. During the course of cooling after densification of the dielectric layer, the amount of shrinkage of the substrate becomes greater than that of shrinkage of the dielectric layer, since the substrate has a thermal expansion coefficient greater than that of the dielectric layer. Therefore, compressive stress is generated in the dielectric layer in a direction parallel to the interface between the dielectric layer and the substrate.

By means of the compressive stress generated in the dielectric layer in a direction parallel to the aforementioned interface, domains in the dielectric layer tend to be oriented in a direction perpendicular to the aforementioned interface. That is, when the dielectric layer is formed on the substrate, the domains tend to be oriented in a direction perpendicular to the interface between the dielectric layer and the substrate, as compared with the case where the dielectric layer is not formed on the substrate. Therefore, inversion of the domains (180° inversion) occurs more readily than rotation of the domains (90° rotation for tetragonal crystals, or 71° or 109° rotation for rhombohedral crystals), and thus domains which are inverted without rotation exceed domains which are rotated and then inverted. Therefore, when an alternating electric field is applied to the dielectric layer, switching of the polarity of the emitter section formed of the dielectric layer can occur rapidly, whereby the electron emitter employing the dielectric layer exhibits high electron emission efficiency.

Preferably, the emitter section is formed so as to have a thickness of 1 to 300 μm.

When the thickness of the emitter section is less than 1 μm, the number of defects increases in the dielectric layer constituting the emitter section, and the emitter section is insufficiently densified. The defects exhibit a dielectric constant considerably lower than that of the dielectric material constituting the emitter section. Therefore, most of the drive voltage to be applied to the electron emitter is applied to the defects in the dielectric layer, and substantially no drive voltage is applied to the aforementioned electron emission region. As a result, the effective drive voltage applied to the electron emission region is reduced, and thus favorable electron emission characteristics are difficult to attain.

In contrast, when the thickness of the emitter section exceeds 300 μm, a large amount of stress is generated in the dielectric layer through application of a drive voltage (particularly in the case where the emitter section is bonded onto the substrate). When such a large amount of stress is generated, in order to properly support the emitter section by the substrate, the thickness of the substrate must be increased considerably. Thus, when the thicknesses of the emitter section and the substrate are increased, difficulty is encountered in miniaturizing and thinning an electron emitter, and thus application of the resultant emitter to a display (in particular, an FED) becomes difficult. In the case of an electron emitter including the emitter section, a first electrode provided on the top surface of the emitter section, and a second electrode provided on the bottom surface of the emitter section, excessively high drive voltage must be applied for attaining an electric field intensity required for electron emission from the emitter. Therefore, the electron emitter requires, for example, a high-voltage-resistance drive IC, leading to an increase in production cost of the electron emitter.

The thickness of the dielectric layer constituting the emitter section is more preferably 5 to 100 μm, from the viewpoints of densification of the structure of the dielectric layer constituting the emitter section, prevention of dielectric breakdown, miniaturization and thinning of an electron emitter, reduction of drive voltage, enhancement of production yield, and attainment of reliable electron emission performance.

Preferably, the electron emitter of the present invention is configured such that it can be operated as follows: in the first stage, a drive voltage is applied such that the first electrode becomes lower in electric potential than the second electrode, whereby electrons are emitted (supplied) from the first electrode toward (the electron emission region of) the top surface of the emitter section; i.e., electrons are accumulated (charged) on the top surface of the emitter section (electron emission region); and in the second stage, a drive voltage is applied such that the first electrode becomes higher in electric potential than the second electrode, whereby the electrons accumulated on the top surface of the emitter section are emitted. Such a configuration allows relatively easy control of the quantity of the charge on the top surface of the emitter section (electron emission region) in the first stage, so that high electron emission quantity can be reliably attained with high controllability.

Particularly preferably, the electron emitter is configured such that an opening is formed in the first electrode, and a portion of the top surface of the emitter section corresponding to the opening is exposed to the exterior of the electron emitter. With this configuration, the electron emission quantity of a single electron emitter is increased, and the opening can serve as a gate electrode or a focusing electron lens with respect to electrons emitted from the top surface of the emitter section. Thus, this configuration can enhance rectilinearity of the emitted electrons. Therefore, when a plurality of electron emitters are arranged on a flat plane, crosstalk between adjacent electron emitters is reduced. Particularly when the electron emitter is applied to FEDs, the resolution of the FEDs is enhanced.

Even when the piezoelectric-film-type electron emitter of the present invention, which has the aforementioned configuration, is used repeatedly, considerable reduction of electron emission quantity is improved; i.e., the electron emitter exhibits enhanced durability.

BRIEF DESCRIPTION OF THE DRAWINGS

Various other objects, features, and many of the attendant advantages of the present invention will be readily appreciated as the same becomes better understood with reference to the following detailed description of the preferred embodiments when considered in connection with the accompanying drawings, in which:

FIG. 8 is a PMT-PZ-PT ternary solid solution diagram for illustrating dielectric compositions employed in Examples and Comparative Examples.

DETAILED DESCRIPTION OF THE INVENTION

Preferred embodiments of the electron emitter of the present invention will next be described with reference to the drawings and tables.

<Schematic Description of FED Including Electron Emitter>

Figure 1:
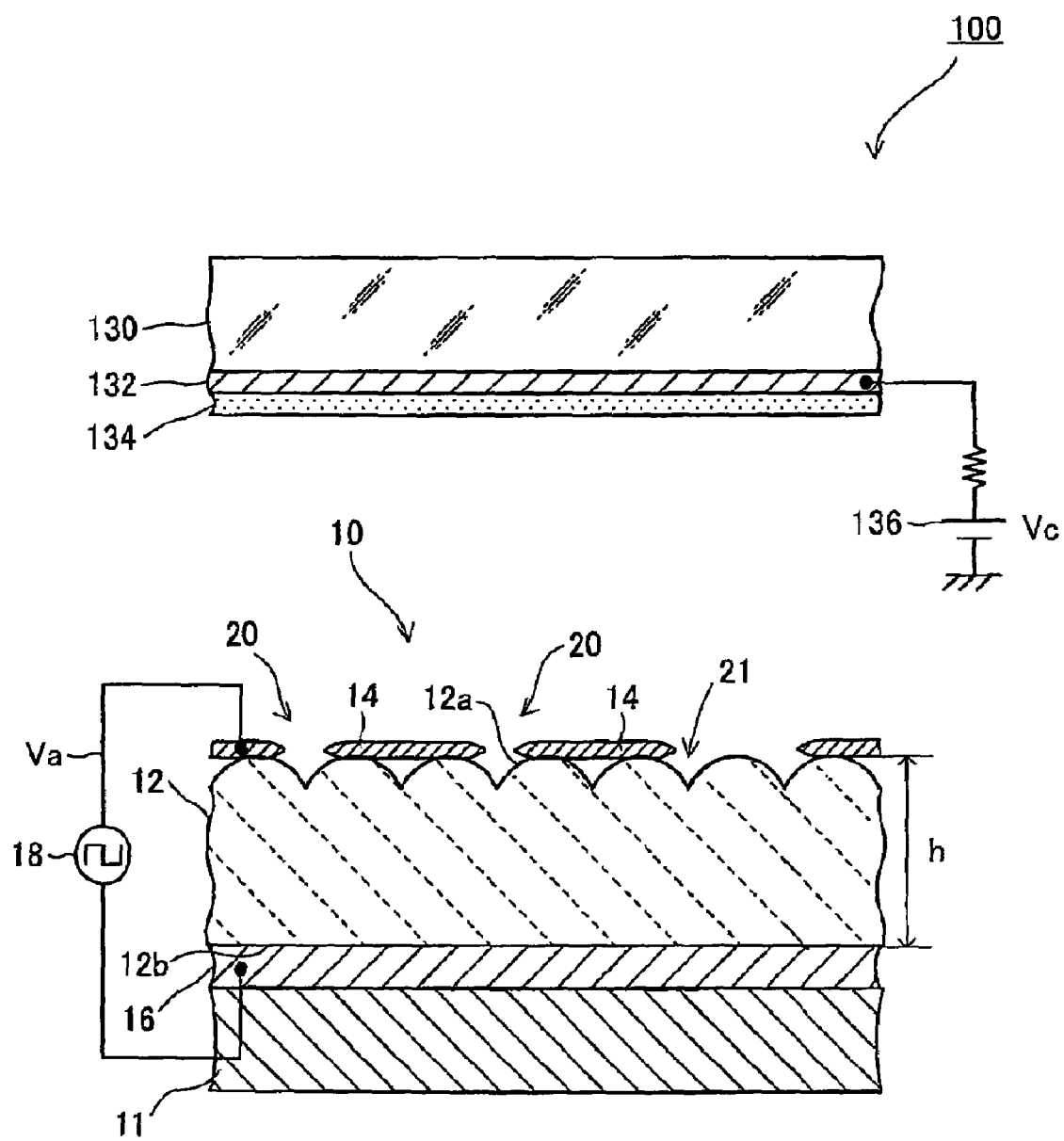
FIG. 1 is a fragmentary, cross-sectional view showing an electron emitter according to an embodiment of the present invention.

FIG. 1 is a partial cross-sectional view schematically showing a display (FED) 100 including an electron emitter 10 according to the present invention.

The display 100 includes the electron emitter 10; a transparent plate 130 provided above the electron emitter 10; a collector electrode 132 formed on the lower surface of the transparent plate 130 (i.e., the surface facing the electron emitter 10); a phosphor layer 134 formed on the lower surface of the collector electrode 132 (i.e., the surface facing the electron emitter 10); a bias voltage source 136 which is connected via a resistor to the collector electrode 132; and a pulse generator 18 which is connected to the electron emitter 10.

The transparent plate 130 is formed of a glass plate or an acrylic plate. The collector electrode 132 is formed of a transparent electrode such as an ITO (indium tin oxide) thin film. The space between the electron emitter 10 and the phosphor layer 134 is a vacuum atmosphere having a predetermined vacuum level of, for example, $10^2$ to $10^{-6}$ Pa (more preferably $10^{-3}$ to $10^{-5}$ Pa). A collector voltage Vc is applied to the collector electrode 132 from the bias voltage source 136 via a predetermined resistor. The display 100 is configured such that electrons are emitted from the electron emitter 10 through an electric field generated through application of the collector voltage Vc, and the electrons fly toward the collector electrode 132 and collide with the phosphor layer 134, whereby light is emitted from predetermined pixel positions.

Numerous electron emitters 10 are two-dimensionally arrayed on a ceramic substrate 11. Each of the electron emitters 10 includes an emitter section 12; a first electrode 14 formed on a top surface 12a of the emitter section 12; and a second electrode 16 which is formed on the substrate 11 so as to be in contact with a bottom surface 12b of the emitter section 12. The first electrode 14 and the second electrode 16 are connected to the pulse generator 18 for applying a drive voltage Va to these electrodes. Notably, FIG. 1 shows one of the numerous electron emitters 10 which are two-dimensionally arrayed on the substrate 11, and a portion of the first electrode 14 of an electron emitter 10 adjacent to the emitter 10 of FIG. 1 is shown on the extreme right of FIG. 1.

The emitter section 12 is a dielectric layer formed of a polycrystalline material containing the dielectric composition employed in the present invention, and the thickness h of the emitter section is preferably 1 to 300 µm, more preferably 5 to 100 µm.

The first electrode 14 is formed of a metallic film, metallic particles, an electrically conductive non-metallic film (e.g., a carbon film or an electrically conductive non-metallic oxide film), or electrically conductive non-metallic particles (e.g., carbon particles or electrically conductive oxide particles). The first electrode 14 is formed on the top surface 12a through coating, vapor deposition, or a similar technique, so as to attain a thickness of 0.1 to 20 µm. The aforementioned metallic film or metallic particles are preferably formed of platinum, gold, silver, iridium, palladium, rhodium, molybdenum, tungsten, or an alloy thereof. The aforementioned electrically conductive non-metallic film or electrically conductive non-metallic particles are preferably formed of graphite, ITO (indium tin oxide), or LSCO (lanthanum strontium copper oxide). When the first electrode 14 is formed of metallic particles or electrically conductive non-metallic particles, preferably, the particles assume a scale-like, plate-like, foil-like, acicular, rod-like, or coil-like form.

The first electrode 14 has a plurality of openings 20. The openings 20 are formed such that the top surface 12a of the emitter section 12 is exposed to the exterior of the electron emitter 10 (i.e., the aforementioned vacuum atmosphere; the same shall apply hereinafter). The top surface 12a of the emitter section 12 is exposed to the exterior of the electron emitter 10 also at peripheral edge portions 21 of the first electrode 14. Preferably, the openings 20 are formed in the first electrode 14 such that the total of the areas of the openings 20 accounts for 5 to 80% of the entire surface area (including the total of the areas of the openings 20) of the emitter section 12 capable of contributing to electron emission. As used herein, "the entire surface area of the emitter section 12 capable of contributing to electron emission" corresponds to the sum of the area of the surface of the emitter section 12 exposed in the vicinity of the peripheral edge portions 21 of the first electrode 14 (i.e., the area of the surface of the emitter section 12 directly below the peripheral edge portions of the first electrode 14) and the total of the areas of the openings 20.

The second electrode 16 is formed of a metallic film so as to attain a thickness of preferably 20 µm or less (more preferably 5 µm or less). Similar to the case of the aforementioned first electrode, the second electrode 16 is formed on the substrate 11 through coating, vapor deposition, or a similar technique.

Specifically, in the electron emitter 10, the second electrode 16 is bonded onto the upper surface of the substrate 11; the emitter section 12 is bonded onto the upper surface of the second electrode 16; and the first electrode 14 is provided on the top surface 12a of the emitter section 12. As used herein, the term "bonded" refers to the case where a component is joined directly and closely to another component without employment of an organic or inorganic adhesive.

As described below in detail, the electron emitter 10 is configured such that electrons supplied from the first electrode 14 are accumulated on the top surface 12a of the emitter section 12 corresponding to the openings 20 and the peripheral edge portions 21, and the thus-accumulated electrons are emitted toward the exterior of the electron emitter 10 (i.e., toward the phosphor layer 134).

<Detailed Description of Electron Emitter>

Figure 2:
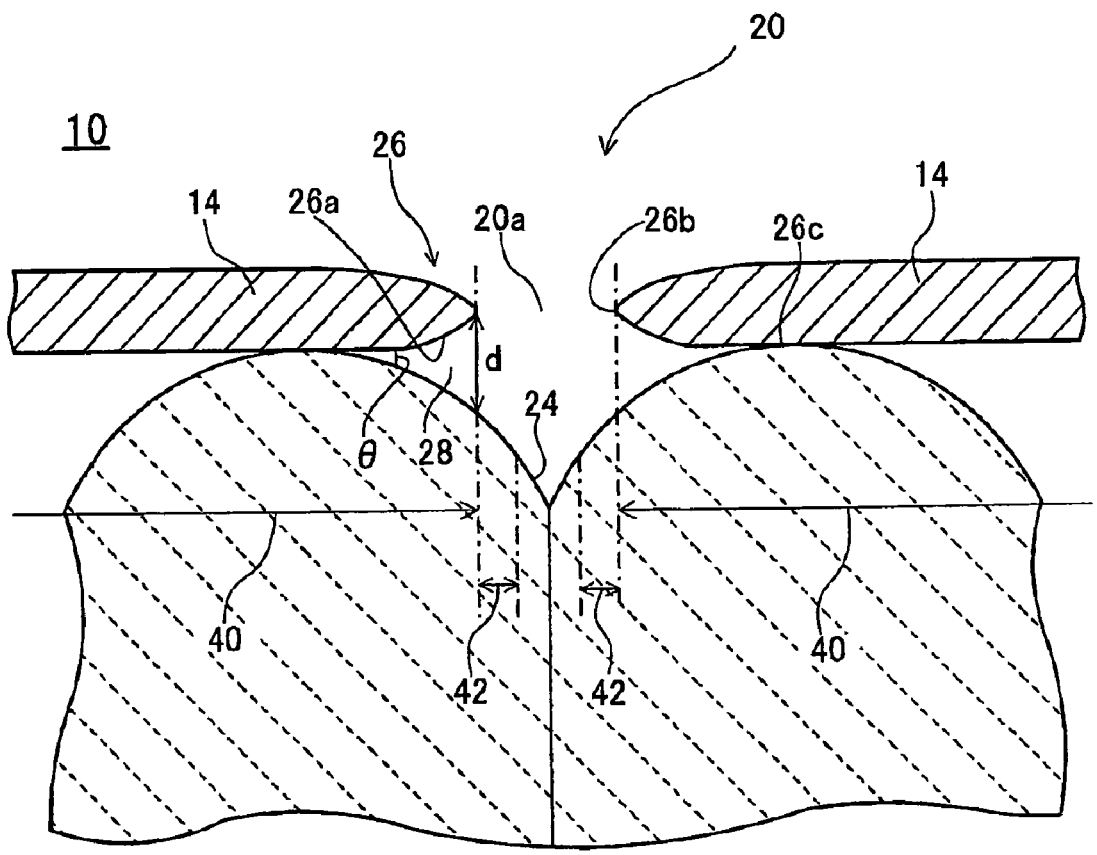
FIG. 2 is an enlarged cross-sectional view showing essential portions of the electron emitter.

FIG. 2 is an enlarged cross-sectional view showing essential portions of the electron emitter 10 of FIG. 1. As described above, the emitter section 12 is formed of a polycrystalline material. Therefore, as shown in FIGS. 1 and 2, microscopic concavities and convexities, which are attributed to grain boundaries, etc., are formed on the top surface 12a of the emitter section 12; specifically, concavities 24 are formed on the top surface 12a of the emitter section 12. The openings 20 of the first electrode 14 are formed in regions corresponding to the concavities 24. In the example illustrated in FIG. 1 or 2, the concavities 24 and the openings 20 are formed in one-to-one correspondence. However, in some cases, a single opening 20 may be formed for a plurality of concavities 24.

As shown in FIG. 2, each of the openings 20 includes a through hole 20a defined by the inner edge 26b of the opening 20, and a surrounding portion 26 (a portion of the first electrode 14) that surrounds the through hole 20a. The first electrode 14 is formed such that a surface 26a of the surrounding portion 26 of the opening 20 that faces the emitter section 12 is apart from the emitter section 12. In other words, a gap 28 is formed between the emitter section 12 and the surface 26a of the surrounding portion 26 of the opening 20, the surface 26a facing the emitter section 12. The cross section of the surrounding portion 26 of the opening 20 of the first electrode 14 assumes an overhanging form (flange form). Accordingly, in the subsequent description, the "surrounding portion 26 of the opening 20 of the first electrode 14" is called an "overhanging portion 26 of the first electrode 14." The "surface 26a of the surrounding portion 26 of the opening 20 of the first electrode 14 that faces the emitter section 12" is called a "lower surface 26a of the overhanging portion 26."

In the electron emitter 10, the top surface 12a of the emitter section 12 (i.e., the surface in the vicinity of the vertexes of convexities), and the lower surface 26a of the overhanging portion 26 of the first electrode 14 form a maximum angle θ that satisfies the following relation: $1° \leq \theta \leq 60°$.

In the electron emitter 10, the emitter section 12 and the first electrode 14 are formed such that the maximum gap d measured vertically between the top surface 12a of the emitter section 12 and the lower surface 26a of the overhanging portion 26 of the first electrode 14 is regulated so as to satisfy the following relation: $0\ \mu m < d \leq 10\ \mu m$, and that the surface roughness Ra (centerline average roughness, unit: μm) of the top surface 12a is regulated to 0.005 or more and 0.5 or less.

Triple junctions (formed by contact among the first electrode 14, the emitter section 12, and a vacuum) 26c are formed at contact sites among the top surface 12a of the emitter section 12, the first electrode 14, and a medium (e.g., a vacuum) surrounding the electron emitter 10. The triple junctions 26c are sites (electric field concentration points) at which lines of electric force concentrate (where electric field concentration occurs) when a drive voltage Va is applied between the first electrode 14 and the second electrode 16. As used herein, the expression "site at which lines of electric force concentrate" refers to a site at which lines of electric force that are generated from the second electrode 16 at even intervals concentrate, when the lines of electric force are drawn under the assumption that the first electrode 14, the emitter section 12, and the second electrode 16 are flat plates each having a cross section extending infinitely. The state of the concentration of lines of electric force (i.e., the state of electric field concentration) can be readily observed through simulation by means of numerical analysis employing the finite-element method.

Further, in the electron emitter 10, the openings 20 are shaped such that the inner edges 26b thereof serve as the aforementioned electric field concentration points. Specifically, the overhanging portion 26 of the opening 20 has such a cross-sectional shape as to be acutely pointed toward the inner edge 26b (the tip end of the overhanging portion 26); i.e., the thickness gradually decreases. The electric field concentration points, which are formed at the inner edge 26b of the opening 20 as described above, and the triple junctions 26c are also formed at sites corresponding to the peripheral edge portions 21 of the first electrode 14.

The openings 20 may be formed to assume a variety of shapes as viewed in plane, including, a circular shape, an elliptical shape, a polygonal shape, and an irregular shape. The openings 20 are formed such that, when the through holes 20a as viewed in plane are approximated to circles having areas identical to those of the through holes 20a as viewed in plane, the average diameter of the circles (hereinafter may be referred to as "the average diameter of the through holes 20a") becomes 0.1 μm or more and 20 μm or less. The reason for this is described below.

As shown in FIG. 2, regions of the emitter section 12 where polarization is inverted or changes in accordance with the drive voltage Va are regions (first regions) 40 located just under the first electrode 14, and regions (second regions) 42 corresponding to regions of the openings 20 that extend from the inner edges 26b (inner peripheries) of the openings 20 toward the centers of the openings 20. Particularly, the range of the second region 42 varies depending on the level of the drive voltage Va and the degree of electric field concentration in the second region 42. In the electron emitter 10, when the average diameter of the through holes 20a falls within the above-described range (i.e., 0.1 μm or more and 20 μm or less), electrons are efficiently emitted in a sufficient quantity through the openings 20.

When the average diameter of the through holes 20a is less than 0.1 μm, the area of the second regions 42 decreases. The second regions 42 form primary regions of the electron emission regions of the top surface 12a of the emitter section 12 for accumulating electrons supplied from the first electrode 14 to thereby contribute to electron emission. Therefore, a decrease in the area of the second regions 42 results in reduction of the quantity of electrons to be emitted. In contrast, when the average diameter of the through holes 20a exceeds 20 μm, the ratio of the second regions 42 to regions of the emitter section 12 exposed through the openings 20 (occupancy of the exposed regions) decreases, resulting in reduction of electron emission efficiency.

<Electron Emission Principle of Electron Emitter>

Figure 3:
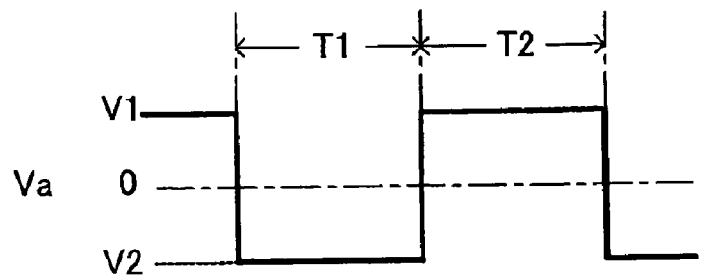
FIG. 3 is a diagram showing the waveform of a drive voltage to be applied to the electron emitter.
Figure 4:
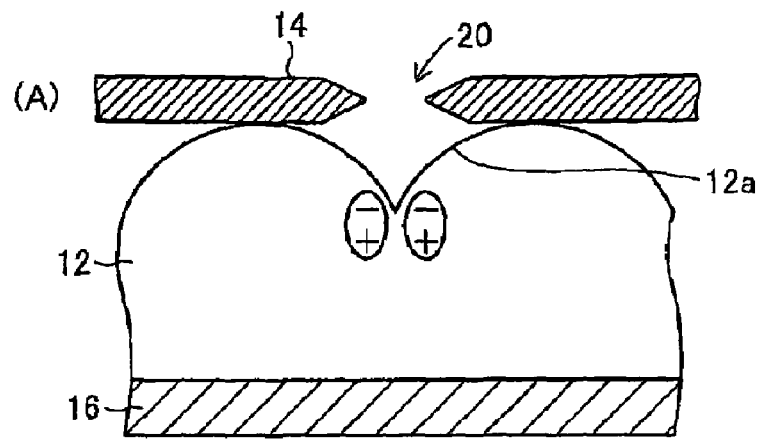
FIG. 4 is a set of explanatory views showing operation of the electron emitter.
Figure 4:
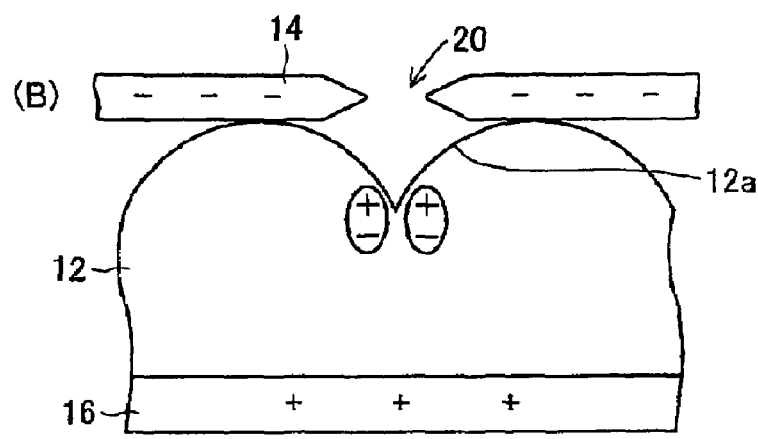
Figure 4:
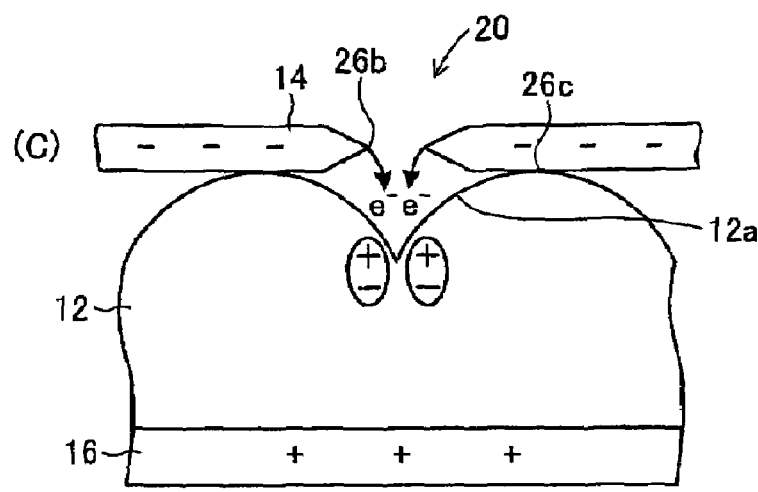
Figure 5:
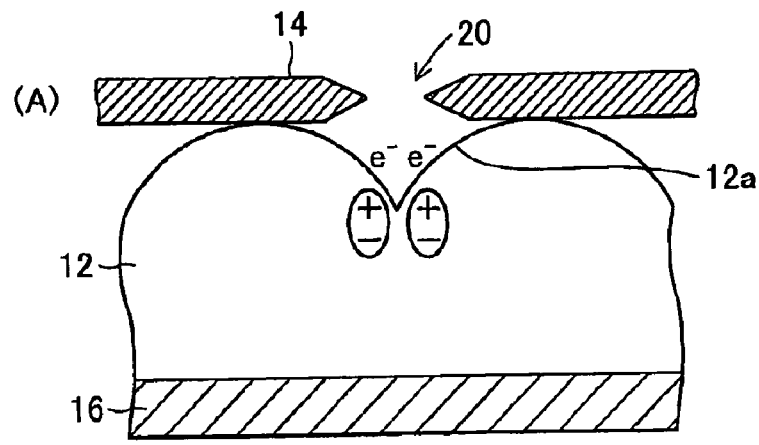
FIG. 5 is a set of explanatory views showing operation of the electron emitter.
Figure 5:
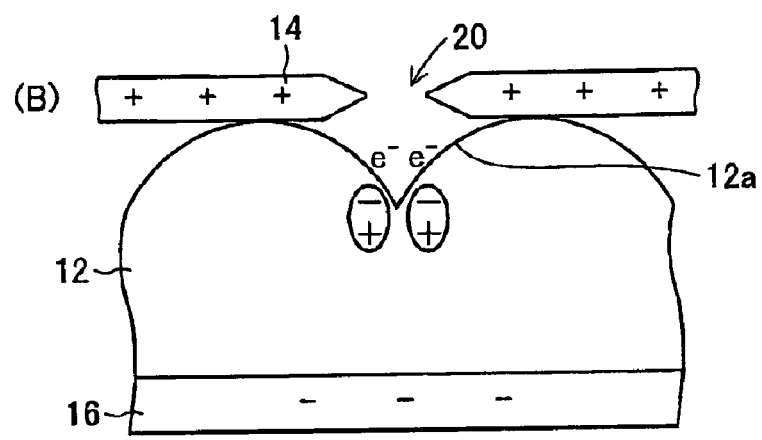
Figure 5:
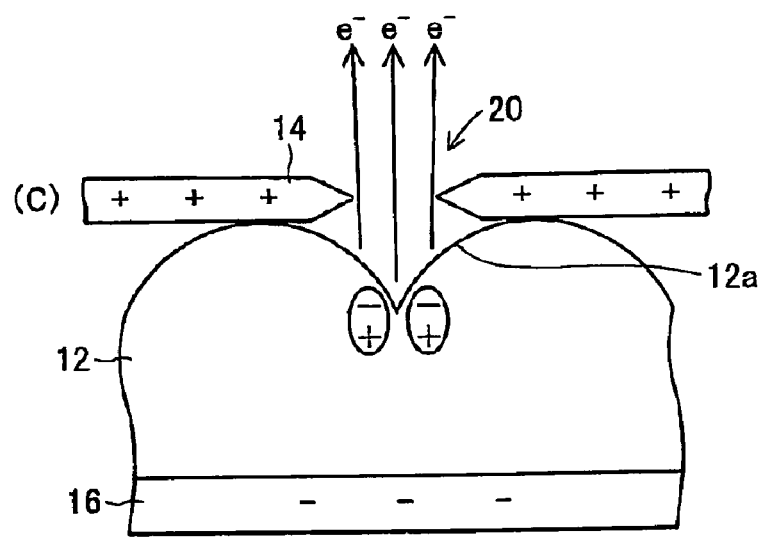

Next, the principle of electron emission of the electron emitter 10 will be described with reference to FIGS. 3 to 5. In the electron emitter 10, as shown in FIG. 3, the drive voltage Va to be applied between the first electrode 14 and the second electrode 16 is an alternating voltage of rectangular waveform having a period of T1+T2. In the drive voltage Va, the reference voltage (voltage corresponding to the center of the wave) is 0 V; during time T1 corresponding to the first stage, the electric potential of the first electrode 14 is V2 (negative voltage), which is lower than the electric potential of the second electrode 16; and during time T2 corresponding to the second stage, the electric potential of the first electrode 14 is V1 (positive voltage), which is higher than the electric potential of the second electrode 16.

In the initial state, the emitter section 12 is polarized unidirectionally. In the subsequent description, it is assumed that the emitter section 12 is initialized such that the negative poles of dipoles face toward the top surface 12a of the emitter section 12 (see FIG. 4A).

Firstly, in the initial state in which the reference voltage is applied, as shown in FIG. 4A, the negative poles of dipoles face toward the top surface 12a of the emitter section 12, so that virtually no electrons are accumulated on the top surface 12a of the emitter section 12.

Subsequently, when the negative voltage V2 is applied, polarization is inverted (see FIG. 4B). This inversion of polarization causes electric field concentration to occur at the inner edge 26b and the triple junction 26c, which are the aforementioned electric field concentration points, so that electrons are emitted (supplied) from the electric field concentration points of the first electrode 14 toward the top surface 12a of the emitter section 12. Thus, electrons are accumulated, for example, in a region of the top surface 12a exposed through the opening 20 of the first electrode 14 and in a region of the top surface 12a in the vicinity of the overhanging portion 26 of the first electrode 14 (see FIG. 4C). In other words, the top surface 12a is charged. This charging can be continued until a predetermined saturated condition, which depends on the surface resistance of the emitter section 12, is attained. The quantity of the charge can be controlled on the basis of application time of a control voltage. Thus, the first electrode 14 (particularly the aforementioned electric field concentration points) functions as an electron supply source for the emitter section 12 (top surface 12a).

Subsequently, when the drive voltage Va is changed from the negative voltage V2 to the reference voltage as shown in FIG. 5A, and then the positive voltage V1 is applied, polarization is re-inverted (see FIG. 5B). As a result, Coulomb repulsion induced by the negative poles of dipoles causes the accumulated electrons to be emitted from the top surface 12a toward the exterior of the electron emitter 10 through the through hole 20a (see FIG. 5C).

In a manner similar to that described above, electrons are emitted from the peripheral edge portions 21 of the first electrode 14 at which the openings 20 are not present.

<Equivalent Circuit of Electron Emitter>

Figure 6:
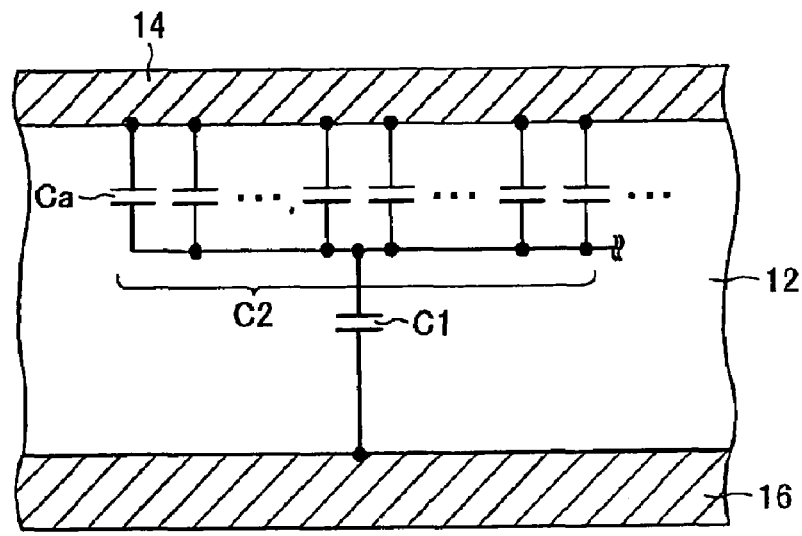
FIG. 6 is an equivalent circuit diagram for explaining influence of a gap between a first electrode and an emitter section on an electric field between the first electrode and a second electrode.

As shown in FIG. 6, in terms of electrical circuit, the structure of the electron emitter 10 can be approximated to a configuration in which a capacitor C1 associated with the emitter section 12 and an aggregate of a plurality of capacitors Ca associated with the gaps 28 are formed between the first electrode 14 and the second electrode 16. Specifically, the equivalent circuit of the electron emitter can be formed as follows: the capacitors Ca associated with the gaps 28 are connected in parallel so as to act as a single capacitor C2, and the capacitor C2 is connected, in series, to the capacitor C1 associated with the emitter section 12.

However, the equivalent circuit, in which the capacitor C2 associated with the aforementioned aggregate is connected in series to the entirety of the capacitor C1 associated with the emitter section 12, is not practical. This is because, the percentage of the capacitor C1 to be connected in series to the capacitor C2 varies depending on, for example, the number of the openings 20 formed in the first electrode 14 and the overall area of the openings 20.

Figure 7:
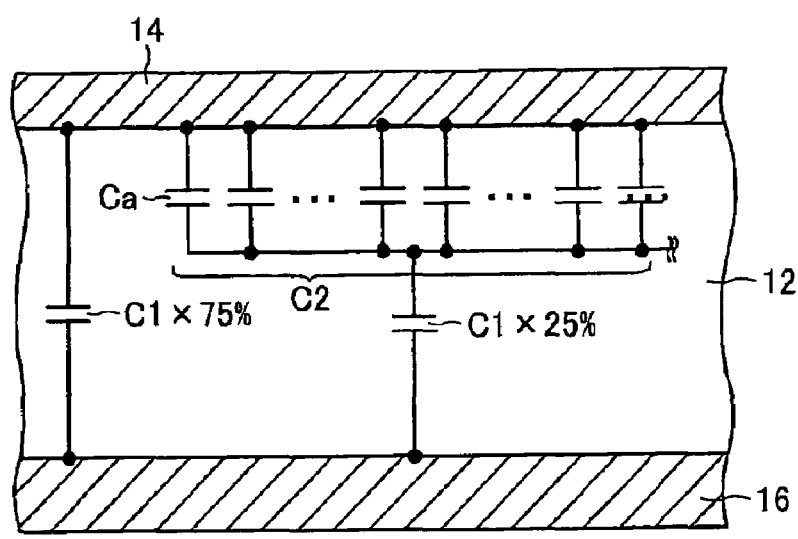
FIG. 7 is an equivalent circuit diagram for explaining influence of the gap between the first electrode and the emitter section on the electric field between the first electrode and the second electrode.

Capacitance calculations will be performed on the assumption that 25% of the capacitor C1 due to the emitter section 12 is connected in series to the capacitor C2 which comprises the cluster of capacitors Ca, as shown in FIG. 7. Since the gaps 28 are in a vacuum, their relative dielectric constant thereof is 1. It is assumed that the maximum distance d across the gaps 28 is 0.1 µm, the area S of each gap 28 is S=1 µm×1 µm, and the number of the gaps 28 is 10,000. It is also assumed that the emitter section 12 has a relative dielectric constant of 2000, the emitter section 12 has a thickness of 20 µm, and the confronting area of the first and second electrode 14, 16 is 200 µm×200 µm. The capacitor C2 which comprises the cluster of capacitors Ca has a capacitance of 0.885 pF, and the capacitor C1 due to the emitter section 12 has a capacitance of 35.4 pF. If the portion of the capacitor C1 due to the emitter section 12 which is connected in series to the capacitor C2 which comprises the cluster of capacitors Ca is 25% of the entire capacitor C1, then that series-connected portion has a capacitance (including the capacitance of capacitor C2 which comprises the cluster of capacitors Ca) of 0.805 pF, and the remaining portion has a capacitance of 26.6 pF.

Since the aforementioned portion of series connection and the remaining portion are connected in parallel, the overall capacitance between the first electrode 14 and the second electrode 16 is 27.5 pF, which is 78% of the capacitance of the capacitor C1 associated with the emitter section 12 (i.e., 35.4 pF). That is, the overall capacitance is lower than the capacitance of the capacitor C1 associated with the emitter section 12.

As described above, the capacitance of the capacitors Ca associated with the gaps 28, or the overall capacitance of the capacitor C2 associated with the aggregate of the capacitors Ca is considerably lower than that of the capacitor C1 (associated with the emitter section 12) which is connected in series to the capacitor C2. Therefore, when the voltage Va is applied to the series circuit of the capacitors Ca (C2) and C1, most of the voltage Va is applied to the capacitors Ca (C2), whose capacitance is lower than that of the capacitor C1. In other words, most of the voltage Va is applied to the gaps 28. Therefore, the voltage is applied to the gaps 28 in a highly efficient manner, and thus a large number of electrons are emitted. That is, high emission of electrons is attained in the electron emitter.

Since the capacitor C2 associated with the aggregate is connected, in series, to the capacitor C1 associated with the emitter section 12, the overall capacitance becomes lower than the capacitance of the capacitor C1 associated with the emitter section 12. This provides favorable characteristics of reduction in overall power consumption.

<Description of Dielectric Composition Forming Emitter Section in First Embodiment>

Specifically, the emitter section 12 employed in the first embodiment is formed from a dielectric composition containing, as a primary component, a composition represented by the following formula (1), and containing NiO in a predetermined amount.

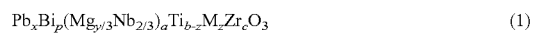

$$Pb_xBi_p(Mg_{y/3}Nb_{2/3})_aTi_{b-z}M_zZr_cO_3 \qquad (1)$$

[wherein x, p, and z satisfy the following relations: $0.85 \leq x \leq 1.03$, $0.02 \leq p \leq 0.1$, and $0.8 \leq s \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W].

When this dielectric composition is employed, the dielectric layer forming the emitter section 12 can be densified, and electron emission characteristics can be improved. Specifically, when the dielectric layer forming the emitter section 12 is densified, the number of defects in the dielectric layer is reduced, and therefore, during application of the drive voltage Va, the electric field intensity at the aforementioned gaps 28 is enhanced, resulting in an increase in the electron emission quantity. In addition, even when the electron emitter 10 is repeatedly used for a long period of time, deterioration of the electron emission performance of the emitter section 12 is improved; i.e., the electron emitter 10 exhibits enhanced durability.

In contrast, as described below in Example 1 and Comparative Example 1, when a, b, and c in formula (1), the Pb or Ti substitution amount, or the NiO content falls outside the aforementioned specific range, the electron emission performance of the emitter section 12 is considerably deteriorated when the electron emitter is repeatedly used.

When the NiO content is very low (i.e., less than 0.05%), the dielectric layer is insufficiently densified, and the electron emission-performance is deteriorated. Specifically, the number of defects (e.g., pores) increases in the dielectric layer forming the emitter section 12, and electric field concentration occurs at such defects, which have lower dielectric constant, whereby the electric field intensity decreases at the electron emission sites corresponding to the gaps 28, resulting in reduction of the electron emission quantity.

From the viewpoint of suppression of deterioration of the emitter section 12 due to repeated use, in the aforementioned ranges specified by the present invention, the amount of Pb substituted by Bi is more preferably 2 to 5 mol %, the amount of Ti substituted by Nb, etc. is more preferably 3 to 8 mol %, and the NiO content is more preferably 0.50 to 1.0 wt. %.

<Production Method for Electron Emitter of First Embodiment>

Firstly, on a substrate 11 which thickness is 0.5 mm formed of $ZrO_2$ stabilized by 3 mol % of $Y_2O_3$, a second electrode 16 containing Pt and having 1 mm×0.5 mm dimensions and a thickness of 3 μm is formed through screen printing. Subsequently, the substrate 11 having the thus-formed second electrode 16 is heated at about 1,000 to about 1,400° C., to thereby bond and combine the second electrode 16 with the substrate 11. The thickness of Pt after bond and combine is 1.5 μm Subsequently, a dielectric composition containing, as a primary component, a composition represented by formula (1) and containing NiO in a predetermined amount (mass %) is applied onto the second electrode 16 through screen printing, so as to form a thick layer having a dimension of 1.1 mm×0.6 mm and a thickness of 40 μm.

Examples of the raw materials for the dielectric composition which may be employed include oxides of Pb, Mg, Nb, Zr, Ti, Ni, etc. (e.g., PbO, $Pb_3O_4$, MgO, $Nb_2O_5$, $TiO_2$, $ZrO_2$, and NiO etc.); carbonates of these elements; compounds containing two or more species of these elements (e.g., $MgNb_2O$); these metallic elements per se; and alloys of these elements. These raw materials may be employed singly or in combination of two or more species.

No particular limitation is imposed on the preparation method for the dielectric composition, and the composition may be prepared through, for example, the following procedure.

Firstly, the aforementioned raw materials are mixed together such that the corresponding elements are contained in predetermined amounts by a general mixing machine such as a ball mill. Subsequently, the resultant raw material mixture is heated at 750 to 1,300° C., to thereby yield a dielectric composition. When the dielectric composition obtained through heating is subjected to X-ray diffractometry, the ratio of the intensity of the strongest diffraction line of a phase other than a perovskite phase (e.g., a pyrochlore phase) to that of the strongest diffraction line of a perovskite phase is preferably 5% or less, more preferably 2% or less. Finally, the dielectric composition obtained through heating is milled by use of, for example, a ball mill, to thereby prepare dielectric composition powder particles having a predetermined particle size (e.g., an average particle size of 0.1 to 1 μm as measured by means of laser diffractometry).

Meanwhile, where necessary, arrangement of particle size may be performed by applying a heat treatment at 400 to 750° C. to the dielectric composition obtained by milling. That is, the finer the particle size is, the easier the neighboring particles integrate during heating. Thus, integration of fine particles may progresses by above-mentioned heat treatment, and then the dielectric composition powder after heat treatment becomes even-sized powder. Therefore, the dielectric film which particle size is even-sized may be obtained.

The thus-prepared dielectric composition powder particles are dispersed in a predetermined binder, to thereby prepare a paste. The paste is applied onto the second electrode 16 through screen printing as described above, to thereby form a thick layer.

The thus-formed dielectric composition layer is heated, to thereby evaporate the binder and densify the dielectric layer. Through this procedure, the emitter section 12 is formed.

Subsequently, a Pt-resinate-containing precursor is applied onto the above-formed emitter section 12 through screen printing at a dimension of 0.95 mm×0.45 mm, followed by thermal treatment, to thereby form a first electrode (Pt electrode) 14. Thus, the electron emitter 10 of dielectric film type is produced.

EXAMPLES

Example 1

As described below, in Examples 1-1 through 1-8 and Comparative Examples 1-1 through 1-9, dielectric-film-type electron emitters were produced through the aforementioned production method. In each of these Examples and Comparative Examples, a display as shown in FIG. 1 was manufactured from the above-produced electron emitter, and the electron emitter was evaluated on the basis of the degree of reduction of brightness of the display after repeated use thereof. Specifically, the initial brightness of the display was measured; the display was subjected to durability testing (i.e., $10^9$ cycles of electron emission operation); the brightness of the display after this durability testing (hereinafter may be referred to simply as "post-durability-test brightness") was measured; and the ratio of the post-durability-test brightness to the initial brightness (takes as 100%) was obtained. Each of the heated emitter sections 12 was found to have a thickness of 24 μm.

Example 1-1

In Example 1-1, there was employed a dielectric composition containing, as a primary component, $Pb_{0.96}Bi_{0.04}(Mg_{1/3}Nb_{2/3})_{0.20}Ti_{0.38}Nb_{0.05}Zr_{0.37}O_3$ and containing NiO in an amount of 1.0 mass %. Meanwhile, in each of Comparative Examples 1-1 through 1-3, there was employed a dielectric composition in which a, b, and c in formula (1) are changed so as to fall outside the scope of the present invention; i.e., a dielectric composition in which the Bi content, the Nb content, and the NiO content are the same as those of the dielectric composition employed in Example 1-1, and the $(Mg_{1/3}Nb_{2/3})$ content, the Ti content, and the Zr content are changed so as to fall outside the scope of the present invention. The results are shown in Table 1.

TABLE 1

|  | Bi content (mol %) | (Mg, Nb) content (mol %) | Ti content (mol %) | Zr content (mol %) | Nb content (mol %) | NiO content (wt. %) | Post-durability-test brightness |
|---|---|---|---|---|---|---|---|
| Ex. 1-1 | 4 | 20 | 38 | 37 | 5 | 1.00 | 77% |
| Comp. Ex. 1-1 | 4 | 60 | 25 | 10 | 5 | 1.00 | 19% |
| Comp. Ex. 1-2 | 4 | 30 | 50 | 15 | 5 | 1.00 | 33% |
| Comp. Ex. 1-3 | 4 | 0 | 45 | 50 | 5 | 1.00 | 22% |

As is clear from the results shown in Table 1, in the case of Example 1-1, in which the ($Mg_{1/3}Nb_{2/3}$) content, the Ti content, and the Zr content fall within the scope of the present invention, the post-durability-test brightness is 77%. In contrast, in the cases of Comparative Examples 1-1 through 1-3, the post-durability-test brightness is a halt or less that in the case of Example 1-1.

Examples 1-2 and 1-3

In each of Examples 1-2 and 1-3 and Comparative Examples 1-4 and 1-5, there was employed a dielectric composition in which the ($Mg_{1/3}Nb_{2/3}$) content, the Ti content, the Zr content, the Nb content, and the NiO content are the same as those of the dielectric composition employed in Example 1-1 and the Bi content is changed. The results are shown in Table 2.

TABLE 2

|  | Bi content (mol %) | (Mg, Nb) content (mol %) | Ti content (mol %) | Zr content (mol %) | Nb content (mol %) | NiO content (wt. %) | Post-durability-test brightness |
|---|---|---|---|---|---|---|---|
| Comp. Ex. 1-4 | 1 | 20 | 38 | 37 | 5 | 1.00 | 25% |
| Ex. 1-2 | 2 | 20 | 38 | 37 | 5 | 1.00 | 73% |
| Ex. 1-1 | 4 | 20 | 38 | 37 | 5 | 1.00 | 77% |
| Ex. 1-3 | 8 | 20 | 38 | 37 | 5 | 1.00 | 59% |
| Comp. Ex. 1-5 | 12 | 20 | 38 | 37 | 5 | 1.00 | 38% |

As is clear from the results shown in Table 2, in the cases of Examples 1-1 through 1-3, in which the Bi content falls within the scope of the present invention, the post-durability-test brightness is about 60% or more. In contrast, in the cases of Comparative Examples 1-4 and 1-5, in which the Bi content falls outside the scope of the present invention, the post-durability-test brightness is less than 40%. Particularly when the amount of Pb substituted by Bi falls within a range of 2 to 5 mol %, the post-durability-test brightness is envisaged to become 70% or more. In the cases of Examples 1-1 and 1-2, in which the Pb substitution amount is 2 to 4 mol %, very high post-durability-test brightness is attained.

Examples 1-4 and 1-5

In each of Examples 1-4 and 1-5 and Comparative Examples 1-6 and 1-7, there was employed a dielectric composition in which the ($Mg_{1/3}Nb_{2/3}$) content, the Ti content, the Zr content, the Bi content, and the NiO content are the same as those of the dielectric composition employed in Example 1-1, and the Nb content is changed. The results are shown in Table 3.

TABLE 3

|  | Bi content (mol %) | (Mg, Nb) content (mol %) | Ti content (mol %) | Zr content (mol %) | Nb content (mol %) | NiO content (wt. %) | Post-durability-test brightness |
|---|---|---|---|---|---|---|---|
| Comp. Ex. 1-6 | 4 | 20 | 42 | 37 | 1 | 1.00 | 47% |
| Ex. 1-4 | 4 | 20 | 41 | 37 | 2 | 1.00 | 66% |
| Ex. 1-1 | 4 | 20 | 38 | 37 | 5 | 1.00 | 77% |
| Ex. 1-5 | 4 | 20 | 35 | 37 | 8 | 1.00 | 70% |
| Comp. Ex. 1-7 | 4 | 20 | 33 | 37 | 12 | 1.00 | 44% |

As is clear from the results shown In Table 3, in the cases of Examples 1-1, 1-4, and 1-5, in which the Nb content falls within the scope of the present invention, the post-durability-test brightness exceeds 60%. In contrast, in the cases of Comparative Examples 1-6 and 1-7, in which the Nb content falls outside the scope of the present invention, the post-durability-test brightness is less than 50%. Particularly when the amount of Ti substituted by Nb falls within a range of 3 to 8 mol %, the post-durability-test brightness is envisaged to become 70% or more. In the cases of Examples 1-1 and 1-5, in which the Ti substitution amount is 5 to 8 mol %, very high post-durability-test brightness is attained.

Examples 1-6 through 1-8

In each of Examples 1-6 through 1-8 and Comparative Examples 1-8 and 1-9, there was employed a dielectric compositions in which the $(Mg_{1/3}Nb_{2/3})$ content, the Ti content, the Zr content, the Bi content, and the Nb content are the same as those of the dielectric composition employed in Example 1-1, and the NiO content is changed. The results are shown in Table 4.

As described above, a clear difference is observed in post-durability-test brightness between the case of Example 1, which falls within the scope of the present invention, and the case of Comparative Example 1, which falls outside the scope of the present invention; and the electron emitters of the Examples, which are invention products, exhibit good durability. Particularly, in the case of Example 1-1, which employs the dielectric composition containing, as a primary component, $Pb_{0.96}Bi_{0.04}(Mg_{1/3}Nb_{2/3})_{0.20}Ti_{0.38}Nb_{0.05}Zr_{0.37}O_3$, and containing NiO in an amount of 1.0 mass %, or in the case where the amount of Pb substituted by Bi is 2 to 5 mol %, the amount of Ti substituted by Nb, etc. is 3 to 8 mol %, and the NiO content is 0.50 to 1.0 wt. %, the post-durability-test brightness becomes very high (70% or more), which is remarkably preferable.

<Description of Dielectric Composition Forming Emitter Section in Second Embodiment>

The emitted section 12 employed in the second embodiment is formed from a dielectric composition containing, as a primary component, a composition represented by formula (1), and containing NiO and $MnO_2$ in predetermined

TABLE 4

| | Bi content (mol %) | (Mg, Nb) content (mol %) | Ti content (mol %) | Zr content (mol %) | Nb content (mol %) | NiO content (wt. %) | Post-durability-test brightness |
|---|---|---|---|---|---|---|---|
| Comp. Ex. 1-8 | 4 | 20 | 38 | 37 | 5 | 0.00 | 38% |
| Ex. 1-6 | 4 | 20 | 38 | 37 | 5 | 0.10 | 55% |
| Ex. 1-7 | 4 | 20 | 38 | 37 | 5 | 0.50 | 69% |
| Ex. 1-1 | 4 | 20 | 38 | 37 | 5 | 1.00 | 77% |
| Ex. 1-8 | 4 | 20 | 38 | 37 | 5 | 2.00 | 58% |
| Comp. Ex. 1-9 | 4 | 20 | 38 | 37 | 5 | 3.00 | 24% |

As is clear from the results shown in Table 4, in the cases of Examples 1-1, 1-6, 1-7, and 1-8, in which the NiO content falls within the scope of the present invention, the post-durability-test brightness is 55% or more. In contrast, in the cases of Comparative Examples 1-8 and 1-9, in which the NiO content falls outside the scope of the present invention, the post-durability-test brightness is less than 40%. Particularly, in the cases of Examples 1-1 and 1-7, in which the NiO content falls within a range of 0.50 to 1.0 wt. %, the post-durability-test brightness is very high (about 70% or more).

Examples 1-9 through 1-11

In Example 1-9, 1-10, or 1-11, the element corresponding to M in formula (1) was changed from Nb to Ta, Mo, or W, respectively. In each of these Examples, high post-durability-test brightness was attained. The results are shown in Table 5.

amounts. That is, the dielectric composition forming the emitter section 12 according to the second embodiment contains the dielectric composition employed in the first embodiment, and contains Mn ($MnO_2$) in a predetermined amount. The emitter section 12 and the electron emitter 10 including the emitter section 12 can be produced in a manner similar to that described above in the first embodiment.

Examples 1-12 through 1-14

In a manner similar to that described above in the first embodiment, a display as shown in FIG. 1 was manufactured from the emitter section 12 according to the second embodiment, and the electron emitter 10 was evaluated on the basis of the degree of reduction of brightness of the display after repeated use. Specifically, the electron emitters of Examples

TABLE 5

| | Bi content (mol %) | (Mg, Nb) content (mol %) | Ti content (mol %) | Zr content (mol %) | Ti substitution element | Ti substitution element content (mol %) | NiO content (wt. %) | Post-durability-test brightness |
|---|---|---|---|---|---|---|---|---|
| Ex. 1-1 | 4 | 20 | 38 | 37 | Nb | 5 | 1.00 | 77% |
| Ex. 1-9 | 4 | 20 | 38 | 37 | Ta | 5 | 1.00 | 71% |
| Ex. 1-10 | 4 | 20 | 40 | 37 | Mo | 3 | 1.00 | 63% |
| Ex. 1-11 | 4 | 20 | 40 | 37 | W | 3 | 1.00 | 65% |

1-12 through 1-14, which contain MnO$_2$ in different amounts, were compared with the electron emitter of Example 1-1, which contains no MnO$_2$. The results are shown in Table 6.

TABLE 6

| | Bi content (mol %) | (Mg, Nb) content (mol %) | Ti content (mol %) | Zr content (mol %) | Ti substitution element | Ti substitution element content (mol %) | NiO content (wt. %) | MnO$_2$ content (wt. %) | Post-durability-test brightness |
|---|---|---|---|---|---|---|---|---|---|
| Ex. 1-1 | 4 | 20 | 38 | 37 | Nb | 5 | 1.00 | 0 | 77% |
| Ex. 1-12 | 4 | 20 | 38 | 37 | Nb | 5 | 1.00 | 0.05 | 78% |
| Ex. 1-13 | 4 | 20 | 38 | 37 | Nb | 5 | 1.00 | 0.2 | 76% |
| Ex. 1-14 | 4 | 20 | 38 | 37 | Nb | 5 | 1.00 | 1.00 | 69% |

As is clear from the result shown in Table 6, the post-durability-test brightness is high in the cases of Example 1-12 (MnO$_2$ content: 0.05 wt. %), Example 1-13 (MnO$_2$ content: 0.2 wt. %), and Example 1-14 (MnO$_2$ content: 1.0 wt. %). Particularly, in the cases of Examples 1-12 and 1-13, in which the MnO$_2$ content falls within a range of 0.01 to 0.2 wt. %, the post-durability-test brightness is very high (75% or more).

<Description of Dielectric Composition Forming Emitter Section in Third Embodiment>

The emitter section 12 employed in the third embodiment is formed from a dielectric composition containing, as a primary component, a composition represented by the following formula (2), and containing NiO in a predetermined amount (as in the cases of the aforementioned embodiments) (note: the dielectric composition is the aforementioned second dielectric composition).

$$Pb_xBi_pSr_q(Mg_{y/3}Nb_{2/3})_aTi_{b-z}M_zZr_cO_3 \quad (2)$$

[wherein x, p, q, and y satisfy the following relations; 0.70≦x≦1.01, 0.02≦p≦0.1, 0.02≦q≦0.15, and 0.8≦y≦1.0; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1): z satisfies the following relation: 0.02≦z≦0.10; and M is at least one element selected from among Nb, Ta, Mo, and W].

Examples 1-15 through 1-17

The dielectric composition forming the emitter section 12 according to the third embodiment is obtained by partially substituting Pb of the dielectric composition employed in the first embodiment by Sr in a predetermined amount. The emitter section 12 and the electron emitter 10 including the emitter section 12 can be produced in a manner similar to that of the above-described embodiments. In the third embodiment, the electron emitter was evaluated in a manner similar to that described above. The results are shown in Table 7.

TABLE 7

| | Bi content (mol %) | Sr content (mol %) | (Mg, Nb) content (mol %) | Ti content (mol %) | Zr content (mol %) | Ti substitution element | Ti substitution element content (mol %) | NiO content (wt. %) | Post-durability-test brightness |
|---|---|---|---|---|---|---|---|---|---|
| Ex. 1-1 | 4 | 0 | 20 | 38 | 37 | Nb | 5 | 1.00 | 77% |
| Ex. 1-15 | 4 | 2 | 20 | 38 | 37 | Nb | 5 | 1.00 | 80% |
| Ex. 1-16 | 4 | 10 | 20 | 38 | 37 | Nb | 5 | 1.00 | 79% |
| Ex. 1-17 | 4 | 20 | 20 | 38 | 37 | Nb | 5 | 1.00 | 72% |

As is clear from the results shown in Table 7, the post-durability-test brightness is high in the cases of Example 1-15 (amount of Pb substituted by Sr: 2 mol %), Example 1-16 (amount of Pb substituted by Sr: 10 mol %), and Example 1-17 (amount of Pb substituted by Sr: 20 mol %). Particularly, when the Pb substitution amount falls within a range of 1 to 15 mol %, the post-durability-test brightness is envisaged to become 75% or more. In the cases of Examples 1-15 and 1-16, in which the Pb substitution amount falls within a range of 1 to 12 mol %, the post-durability-test brightness is very high (about 80%).

<Description of Dielectric Composition in Fourth Embodiment>

The emitter section 12 employed in the fourth embodiment predominantly contains the aforementioned third dielectric composition; i.e., a dielectric composition represented by the following formula (3):

$$Pb_x(Mg_{y/3}Nb_{2/3})_aTi_bZr_cO_3 \quad (3)$$

[wherein x and y satisfy the following relations: 0.95≦x≦1.05 and 0.90≦y≦1.10; and a, b, and c are decimal numbers falling within a region formed by connecting the following five points (0.500, 0.350, 0.150), (0.500, 0.100, 0.400), (0.050, 0.100, 0.850), (0.050, 0.425, 0.525), and (0.250, 0.360, 0.390) in a triangular coordinate system of (a, b, c) having the following three vertexes (1, 0, 0), (0, 1, 0), and (0, 0, 1)].

The values (a, b, c) fall within the pentagonal region defined by the thick solid line in the PMT-PZ-PT ternary solid solution diagram of FIG. 8. As is clear from FIG. 8, the dielectric composition represented by the aforementioned formula has, as a primary crystal phase, a rhombohedral crystal phase or a pseudocubic crystal phase, unlike the case of a conventional piezoelectric material formed of a lead-containing perovskite oxide having a tetragonal crystal phase as a primary crystal phase, such as a PZT material for a piezoelectric actuator or a ferroelectric memory.

<Production Method for Electron Emitter of Fourth Embodiment>

Firstly, in a manner similar to that described above in the first or second embodiment, a second electrode 16 is formed on a substrate 11 formed of $Y_2O_3$-stabilized $ZrO_2$ through screen printing, and the second electrode 16 is bonded onto and combined with the substrate 11 through thermal treatment.

Subsequently, a dielectric composition containing, as a primary component, a composition represented by formula (3) is applied onto the second electrode 16 through screen printing, so as to form a thick layer having a thickness of 40 μm. Thereafter, the thus-formed thick dielectric layer is heated together with the substrate 11, and is combined with the substrate 11, to thereby form the emitter section 12. The thermal treatment temperature is preferably 1,000 to 1,400° C., more preferably 1,100 to 1,350° C. The dielectric composition can be prepared in a manner similar to that described above in the first embodiment.

If desired, the dielectric composition powder particles obtained through milling may be heated at 400 to 750° C. for particle size regulation. In general, a fine particle tends to aggregate with adjacent fine particles under heating. Therefore, when the dielectric composition powder particles (fine particles) are subjected to thermal treatment, aggregation of the fine particles proceeds, and the resultant dielectric powder particles exhibit a uniform particle size; i.e., the particles contained in the resultant dielectric layer exhibit a uniform particle size.

Subsequently, a first electrode 14 is formed in a manner similar to that described above in the first embodiment. Thus, the piezoelectric-film-type electron emitter 10 of the fourth embodiment is produced.

Example 2

Examples 2-1 and 2-2

As described below, piezoelectric-film-type electron emitters were produced by use of dielectric compositions of Example 2 and Comparative Example 2 through the aforementioned production method. In each of these Examples and Comparative Examples, a display as shown in FIG. 1 was manufactured from the above-produced electron emitter, and the electron emitter was evaluated on the basis of the degree of reduction of brightness of the display after repeated use thereof. Specifically, the initial brightness of the display was measured; the display was subjected to durability testing (i.e., $10^9$ cycles of electron emission operation): the brightness of the display after this durability testing (post-durability-test brightness) was measured; and the ratio of the post-durability-test brightness to the initial brightness (taken as 100%) (the ratio will be called "durability" in the following description and tables) was obtained. Each of the heated emitter sections 12 was found to have a thickness of 24 μm.

In Examples 2-1 and 2-2, there were respectively employed a dielectric composition of formula (3) in which (a, b, c) are (0.375, 0.25, 0.375); and a dielectric composition of formula (3) in which (a, b, c) are (0.10, 0.36, 0.54). Meanwhile, in Comparative Examples 2-1, 2-2, and 2-3, there were respectively employed a dielectric composition of formula (3) in which (a, b, c) are (0.55, 0.175, 0.275); a dielectric composition of formula (3) in which (a, b, c) are (0.375, 0.050, 0.575); and a dielectric composition of formula (3) in which (a, b, c) are (0.03, 0.37, 0.60). In Comparative Example 2-4, there was employed a dielectric composition represented by $Pb(Mg_{1/3}Nb_{2/3})_{0.20}Ti_{0.38}Nb_{0.05}Zr_{0.37}O_3$ (i.e., a dielectric composition in which Ti is partially substituted by Nb, and (a, b, c) are (0.20, 0.43, 0.37)). The evaluation results are shown in Table 8. In FIG. 8, compositions corresponding to the Examples are represented by closed circles with suffixes (suffixes "1" and "2" correspond to Examples 2-1 and 2-2, respectively), and compositions corresponding to the Comparative Examples are represented by "*" with suffixes (suffixes "1," "2," "3," and "4" correspond to Comparative Examples 2-1, 2-2, 2-3, and 2-4, respectively).

TABLE 8

| | (Mg, Nb) content (mol %) | Ti content (mol %) | Zr content (mol %) | Pb substitution element/element content (mol %) | Ti substitution element/element content (mol %) | Durability |
|---|---|---|---|---|---|---|
| Ex. 2-1 | 37.5 | 25 | 37.5 | — | — | 74% |
| Ex. 2-2 | 10 | 36 | 54 | — | — | 68% |
| Comp. Ex. 2-1 | 55 | 17.5 | 27.5 | — | — | 43% |
| Comp. Ex. 2-2 | 37.5 | 5 | 57.5 | — | — | 38% |
| Comp. Ex. 2-3 | 3 | 37 | 60 | — | — | 47% |
| Comp. Ex. 2-4 | 20 | 38 | 37 | — | Nb/5 | 38% |

As is clear from the results shown in Table 8 and FIG. 8, in the cases of Examples 2-1 and 2-2, which fall within the scope of the present invention, the durability is about 70%, whereas in the cases of Comparative Examples 2-1 through 2-3, the durability is less than 50%. From the viewpoint of attaining further high durability, preferably, there is employed a dielectric composition in which (a, b, c) fall within a region formed by connecting the following five points (0.500, 0.320, 0.180), (0.500, 0.100, 0.400), (0.050, 0.100, 0.850), (0.050, 0.425, 0.525), and (0.380, 0.320, 0.300) in the aforementioned triangular coordinate system; and more preferably, there is employed a dielectric composition in which (a, b, c) fall within a region formed by connecting the following six points (0.500, 0.320, 0.180), (0.500, 0.150, 0.350), (0.350, 0.150, 0.500), (0.050, 0.350, 0.600), (0.050, 0.425, 0.525), and (0.380, 0.320, 0.300) in the triangular coordinate system (i.e., a region defined by the broken line in FIG. 8). Most preferably, there is employed a dielectric composition in which (a, b, c) fall within a region formed by connecting the following six points (0.500, 0.320, 0.180), (0.500, 0.150, 0.350), (0.350, 0.150, 0.500), (0.050, 0.350, 0.600), (0.050, 0.385, 0.565), and (0.380, 0.320, 0.300) in the triangular coordinate. The dielectric compositions employed in Example 2-1, Example 2-2, and Comparative Example 2-4 have, as a primary crystal phase, a pseudocubic crystal phase, a rhombohedral crystal phase, and a tetragonal crystal phase, respectively.

<Description of Dielectric Composition in Fifth Embodiment>

The emitter section 12 employed in the fifth embodiment predominantly contains the aforementioned fourth dielectric composition; i.e., a dielectric composition represented by the following formula (4). This dielectric composition is obtained by substituting Pb of the third dielectric composition by another predetermined element. This dielectric composition is produced in a manner similar to that described in the fourth embodiment.

$$Pb_{x-p}Ma_p(Mg_{y/3}Nb_{2/3})_aTi_bZr_cO_3 \qquad (4)$$

[wherein x, y, a, b, and c fall within ranges corresponding to those of x, y, a, b, and c in formula (3); and Ma is at least one element selected from among Sr, La, and Bi].

Examples 2-3 through 2-5

In a manner similar to that described above in the fourth embodiment, piezoelectric-film-type electron emitters were produced by use of dielectric compositions of Examples 2-3 through 2-5, and the thus-produced electron emitters were subjected to evaluation. In Examples 2-3, 2-4, and 2-5, there were respectively employed a dielectric composition of formula (4) in which (a, b, c) are (0.375, 0.25, 0.375), Ma is Sr, and p is 0.02; a dielectric composition of formula (4) in which (a, b, c) are (0.375, 0.25, 0.375), Ma is Sr, and p is 0.06; and a dielectric composition of formula (4) in which (a, b, c) are (0.375, 0.25, 0.375), Ma is Sr, and p is 0.12. The dielectric composition employed in each of Examples 2-3 through 2-5 is a dielectric composition obtained by substituting Pb of the dielectric composition (primary crystal phase: pseudocubic crystal phase) employed in Example 2-1 by Sr in a predetermined amount. The evaluation results of these Examples are shown in Table 9. The results of Example 2-1 are also shown in Table 9 for reference, since, as described above, the dielectric composition employed in Example 2-1 corresponds substantially to a dielectric composition of formula (4) in which p is zero.

TABLE 9

| | (Mg, Nb) content (mol %) | Ti content (mol %) | Zr content (mol %) | Pb substitution element/ element content (mol %) | Ti substitution element/ element content (mol %) | Durability |
|---|---|---|---|---|---|---|
| Ex. 2-1 | 37.5 | 25 | 37.5 | — | — | 74% |
| Ex. 2-3 | 37.5 | 25 | 37.5 | Sr/2 | — | 73% |
| Ex. 2-4 | 37.5 | 25 | 37.5 | Sr/6 | — | 76% |
| Ex. 2-5 | 37.5 | 25 | 37.5 | Sr/12 | — | 69% |

As is clear from the results shown in Table 9, when p falls within a range of 0 to 0.12, a high durability of about 70% or more is attained. No significant difference is observed in durability between the case of Example 2-1 (in which p is zero) and the case of Example 2-3 (in which p is 0.02); i.e., no significant effect of Sr is observed in these Examples. In contrast, in the case of Example 2-4 (in which p is 0.06), the effect of Sr on durability improvement is observed. Meanwhile, in the case of Example 2-5 (in which p is 0.12), the durability is slightly lower than that in the case of Example 2-1 (in which no Sr is added). The results indicate that, when the value p (corresponding to the Sr content) falls within a range of 0.03 to 0.15, sufficient durability is envisaged to be attained, and that, from the viewpoint of attaining higher durability, the p value preferably falls within a range of 0.03 to 0.10, more preferably 0.05 to 0.07.

Examples 2-6 through 2-9

In Examples 2-6, 2-7, and 2-8, there were respectively employed a dielectric composition of formula (4) in which Ma is La, and p is 0.002; a dielectric composition of formula (4) in which Ma is La, and p is 0.007; and a dielectric composition of formula (4) in which Ma is La, and p is 0.012. In Example 2-9, there was employed a dielectric composition of formula (4) in which Ma is Bi, and p is 0.007. The evaluation results of these Examples are shown in Table 10. Similar to the case of Table 9, the results of Example 2-1 (in which p is zero) are shown in Table 10 for reference.

TABLE 10

| | (Mg, Nb) content (mol %) | Ti content (mol %) | Zr content (mol %) | Pb substitution element/ element content (mol %) | Ti substitution element/ element content (mol %) | Durability |
|---|---|---|---|---|---|---|
| Ex. 2-1 | 37.5 | 25 | 37.5 | — | — | 74% |
| Ex. 2-6 | 37.5 | 25 | 37.5 | La/0.2 | — | 75% |
| Ex. 2-7 | 37.5 | 25 | 37.5 | La/0.7 | — | 79% |
| Ex. 2-8 | 37.5 | 25 | 37.5 | La/1.2 | — | 72% |
| Ex. 2-9 | 37.5 | 25 | 37.5 | Bi/0.7 | — | 75% |

As is clear from the results shown in Table 10, when p falls within a range of 0 to 0.012, a high durability of more than 70% is attained. No significant difference is observed in durability among the cases of Example 2-1 (in which p is zero), Example 2-6 (in which p is 0.002), and Example 2-8 (in which p is 0.012); i.e., no significant effect of La is observed in these Examples. In contrast, in the case of Example 2-7 (in which p is 0.007), the remarkable effect of La on durability improvement is observed. As is clear from the results of Example 2-9, the effect of Bi on durability improvement is observed. The results indicate that, when the value p (corresponding to the (La+Bi) content) falls within a range of 0.002 to 0.015, sufficient durability is envisaged to be attained, and that, from the viewpoint of attaining higher durability, the p value preferably falls within a range of 0.003 to 0.010, more preferably 0.005 to 0.009.

Example 2-10

In Example 2-10, there was employed a combination of the dielectric composition of Example 2-4 (i.e., a dielectric composition of formula (4) in which Ma is Sr, and p is 0.06), which exhibits the highest durability among the cases of Examples 2-3 through 2-5, and the dielectric composition of Example 2-7 (i.e., a dielectric composition of formula (4) in which Ma is La, and p is 0.007), which exhibits the highest durability among the cases of Examples 2-6 through 2-8. The evaluation results are shown in Table 11. Similar to the case of Table 9 or 10, the results of Example 2-1 (in which p is zero) are shown in Table 11 for reference.

TABLE 11

| | (Mg, Nb) content (mol %) | Ti content (mol %) | Zr content (mol %) | Pb substitution element/ element content (mol %) | Ti substitution element/ element content (mol %) | Durability |
|---|---|---|---|---|---|---|
| Ex. 2-1 | 37.5 | 25 | 37.5 | — | — | 74% |
| Ex. 2-10 | 37.5 | 25 | 37.5 | Sr/6 La/0.7 | — | 80% |

As is clear from the results shown in Table 11, in the case of Example 2-10, a very high durability of 80% is attained. The results indicate that, from the viewpoint of durability, employment of a dielectric composition containing Sr (mole fraction: 0.05 to 0.07) and La (mole fraction: 0.005 to 0.009) is most preferred.

<Description of Dielectric Composition in Sixth Embodiment>

The emitter section 12 employed in the sixth embodiment predominantly contains the aforementioned fifth dielectric composition; i.e., a dielectric composition represented by the following formula (5). This dielectric composition is produced in a manner similar to that described in the fourth or fifth embodiment.

$$Pb_x(Mg_{y/3}Nb_{2/3})_a Ti_{b-q} Mb_q Zr_c O_3 \quad (5)$$

[wherein x, y, a, b, and c fall within ranges corresponding to those of x, y, a, b, and c in formula (3); and Mb is at least one element selected from among Nb, Ta, Mo, and W].

Examples 2-11 through 2-14

In a manner similar to that described above in the fourth or fifth embodiment, piezoelectric-film-type electron emitters were produced in Examples 2-11 through 2-14, and the thus-produced electron emitters were subjected to evaluation. In Examples 2-11, 2-12, 2-13, and 2-14, there were respectively employed a dielectric composition of formula (5) in which Mb is Nb, and q is 0.005; a dielectric composition of formula (5) in which Mb is Nb, and q is 0.02; a dielectric composition of formula (5) in which Mb is Nb, and q is 0.05; and a dielectric composition of formula (5) in which Mb is Nb, and q is 0.12. The dielectric composition employed in each of Examples 2-11 through 2-14 is a dielectric composition obtained by substituting Ti of the dielectric composition employed in Example 2-1 (in which (a, b, c) in formula (3) are (0.375, 0.25, 0.375)) by Nb in a predetermined amount. The evaluation results of these Examples are shown in Table 12. The results of Example 2-1 are also shown in Table 12 for reference, since the dielectric composition employed in Example 2-1 corresponds substantially to a dielectric composition of formula (5) in which q is zero.

TABLE 12

| | (Mg, Nb) content (mol %) | Ti content (mol %) | Zr content (mol %) | Pb substitution element/ element content (mol %) | Ti substitution element/ element content (mol %) | Durability |
|---|---|---|---|---|---|---|
| Ex. 2-1 | 37.5 | 25 | 37.5 | — | — | 74% |
| Ex. 2-11 | 37.5 | 25 | 37.5 | — | Nb/0.5 | 74% |
| Ex. 2-12 | 37.5 | 25 | 37.5 | — | Nb/2 | 76% |
| Ex. 2-13 | 37.5 | 25 | 37.5 | — | Nb/5 | 77% |
| Ex. 2-14 | 37.5 | 25 | 37.5 | — | Nb/12 | 71% |

As is clear from the results shown in Table 12, when q falls within a range of 0 to 0.12, a high durability of more than 70% is attained. No significant difference is observed in durability between the case of Example 2-1 (in which q is zero) and the case of Example 2-11 (in which q is 0.005), and, in the case of Example 2-14 (in which q is 0.12), the durability is slightly lower than that in the case of Example 2-1 (in which q is zero). In contrast, in the cases of Example 2-12 (in which q is 0.02) and Example 2-13 (in which q is 0.05), the effect of Nb on durability improvement is observed. The results indicate that, when the value q (corresponding to the Nb content) falls within a range of 0.01 to 0.15, sufficient durability is envisaged to be attained, and that, from the viewpoint of attaining higher durability, the q value preferably falls within a range of 0.02 to 0.10, more preferably 0.02 to 0.08.

Examples 2-15 through 2-17

In a manner similar to that described above in the fourth or fifth embodiment, piezoelectric-film-type electron emitters were produced in Examples 2-15 through 2-17, and the thus-produced electron emitters were subjected to evaluation. In these Examples, there were employed dielectric compositions obtained through modification of the dielectric composition employed in Example 2-13 (i.e., a dielectric composition of formula (5) in which q is 0.05 and Mb is Nb), which exhibits the highest durability among the cases of Examples 2-11 through 2-14. Specifically, in Examples 2-15, 2-16, and 2-17, there were respectively employed a dielectric composition in which Mb is Ta, a dielectric composition in which Mb is Mo, and a dielectric composition in which Mb is W. The evaluation results of these Examples are shown in Table 13. In a manner similar to that described above, the results of Example 2-1 (in which q is zero) are shown in Table 13 for reference.

TABLE 13

| | (Mg, Nb) content (mol %) | Ti content (mol %) | Zr content (mol %) | Pb substitution element/ element content (mol %) | Ti substitution element/ element content (mol %) | Durability |
|---|---|---|---|---|---|---|
| Ex. 2-1 | 37.5 | 25 | 37.5 | — | — | 74% |
| Ex. 2-15 | 37.5 | 25 | 37.5 | — | Ta/5 | 70% |
| Ex. 2-16 | 37.5 | 25 | 37.5 | — | Mo/5 | 63% |
| Ex. 2-17 | 37.5 | 25 | 37.5 | — | W/5 | 61% |

As is clear from the results shown in Table 13, even when Ta, Mo, or W is contained in place of Nb, high durability is attained.

<Electric-Field-Induced Strain and Crystal System>

In the case of Example 2-10, which exhibits the highest durability among the cases of Examples 2-1 through 2-17, the composition represented by the aforementioned PMN-PZ-PT ternary solid solution diagram is the same as that in the case of Example 2-1, and has a pseudocubic crystal phase as a primary crystal phase (i.e., the plot of Example 2-10 coincides with that of Example 2-1 in FIG. 8). In Comparative Example 2-5, there was employed a dielectric composition obtained by modifying the dielectric composition of Example 2-10 so as to exhibit a tetragonal crystal phase, in which the mole fraction of PMN was not changed. Specifically, in Comparative Example 2-5, there was employed a dielectric composition of formula (4) wherein (a, b, c) are (0.375, 0.375, 0.25), which differ from those of the dielectric composition employed in Example 2-10 (a=0.375, b=0.25, c=0.375); Ma is Sr and La; p(Sr) (i.e., Sr content) is 0.06; and p(La) (i.e., La content) is 0.007 (the composition employed in Comparative Example 2-5 is shown in the ternary solid solution diagram of FIG. 8 for reference). The evaluation results are shown in Table 14. The results of Examples 2-1 and 2-2 are also shown in Table 14 for reference.

TABLE 14

| | (Mg, Nb) content (mol %) | Ti content (mol %) | Zr content (mol %) | Pb substitution element/ element content (mol %) | Crystal system | Electric-field-induced strain (%) | Durability |
|---|---|---|---|---|---|---|---|
| Ex. 2-1 | 37.5 | 25 | 37.5 | — | Pseudocubic | 0.06 | 74% |
| Ex. 2-2 | 10 | 36 | 54 | — | Rhombohedral | 0.056 | 68% |
| Ex. 2-10 | 37.5 | 25 | 37.5 | Sr/6 La/0.7 | Pseudocubic | 0.065 | 80% |
| Comp. Ex. 2-5 | 37.5 | 37.5 | 25 | Sr/6 La/0.7 | Tetragonal | 0.098 | 38% |

As is clear from the results shown in Table 14, in the case of Comparative Example 2-5 (primary crystal phase: tetragonal crystal phase), the electric-field-induced strain is as high as 0.098%, and the durability is considerably low. In contrast, in the cases of Example 2-1 (pseudocubic crystal phase), Example 2-2 (rhombohedral crystal phase), and Example 2-10 (pseudocubic crystal phase), the electric-field-induced strain is 0.07% or less (i.e., 0.06% for Example 2-1, 0.056% for Example 2-2, and 0.065% for Example 2-10). In these Examples, the durability is about 70%. As described above, in the case of Example 2-1, 2-2, or 2-10 (primary crystal phase: pseudocubic or rhombohedral crystal phase), in which the electric-field-induced strain is 0.07% or less, high durability is attained.

<Modifications>

The present invention is not limited to the above-described embodiments and Examples, and appropriate modifications of the invention may be made so long as the essentials of the present invention are not changed. Modifications of the present invention will next be described, but the invention is not limited to the following modifications.

Examples of the raw materials which may be employed for the aforementioned dielectric compositions include oxides of Pb, Mg, Nb, Zr, Ti, Ni, etc. (e.g., PbO, $Pb_3O_4$, MgO, $Nb_2O_5$, $TiO_2$, and $ZrO_2$ etc.); carbonates of these elements: compounds containing two or more species of these elements (e.g., $MgNb_2O$); these metallic elements per se; and alloys of these elements. These raw materials may be employed singly or in combination of two or more species.

Addition of Ni may be performed through any technique, so long as the Ni content (as reduced to NiO) falls within the aforementioned range. For example, there may be employed a technique in which NiO is added to a dielectric composition which has been prepared in advance. Preferably, the thus-added Ni (NiO) is uniformly dispersed in the emitter section 12. However, the Ni (NiO) may be dispersed in the emitter section 12 such that the Ni (NiO) concentration increases in a thickness direction of the emitter section 12 from the bottom surface 12b (which is bonded onto the substrate 11) toward the top surface 12a.

The dielectric composition forming the emitter section 12 may be prepared through a variety of techniques other than the technique described above in the Examples. For example, the dielectric composition may be prepared through the alkoxide method or the coprecipitation method. Although thermal treatment is preferably performed after formation of the first electrode 14 or the second electrode 16, the thermal treatment is not necessarily carried out. However, in order to bond and combine the second electrode 16 with the substrate 11, preferably, thermal treatment is performed after the second electrode 16 is formed on the substrate 11 as described above the Examples.

The configuration of the electron emitter of the present invention is not limited to that of the electron emitter described above in the embodiments. For example, both the first electrode 14 and the second electrode 16 may be formed on the top surface 12a of the electron emitter 12, although, in the aforementioned embodiments, the first electrode 14 and the second electrode 16 are respectively formed on the top surface 12a and the bottom surface 12b of the emitter section 12. Each of the first electrode 14, the emitter section 12, and the second electrode 16 may have a multi-layer structure.

The substrate 11 may be formed of a glass or metallic material in place of a ceramic material. No particular limitation is imposed on the type of the ceramic material to be employed. However, from the viewpoints of heat resistance, chemical stability, and insulating property, the substrate 11 is preferably formed of a ceramic material containing at least one species selected from the group consisting of stabilized zirconium oxide, aluminum oxide, magnesium oxide, mullite, aluminum nitride, silicon nitride, and glass. More preferably, the substrate 11 is formed of stabilized zirconium oxide, from the viewpoints of high mechanical strength and excellent toughness.

As used herein, the term "stabilized zirconium oxide" refers to zirconium oxide in which crystal phase transition is improved through addition of a stabilizer. The stabilized zirconium oxide encompasses partially stabilized zirconium oxide. Examples of the stabilized zirconium oxide include zirconium oxide containing a stabilizer (e.g., calcium oxide, magnesium oxide, yttrium oxide, scandium oxide, ytterbium oxide, cerium oxide, or an oxide of a rare earth metal) in an amount of 1 to 30 mol %. From the viewpoint of further enhancement of the mechanical strength of a vibration section, zirconium oxide containing yttrium oxide as a stabilizer is preferably employed. In this case, the yttrium oxide content is preferably 1.5 to 6 mol %, more preferably 2 to 4 mol %. Zirconium oxide containing, in addition to yttrium oxide, aluminum oxide in an amount of 0.1 to 5 mol % is more preferred. Furthermore, it is preferable that Titanium oxide is contained in an amount of 0.1 to 10 mol %.

The stabilized zirconium oxide may have, for example, a cubic-monoclinic mixed crystal phase, a tetragonal-monoclinic mixed crystal phase, or a cubic-tetragonal-monoclinic mixed crystal phase. From the viewpoints of strength, toughness, and durability, the stabilized zirconium oxide preferably has, as a primary crystal phase, a tetragonal crystal phase or a tetragonal-cubic mixed crystal phase.

As described in Example 2-10, Pb may be partially substituted by two or more elements selected from among Sr, La, and Bi (similarly, Ti may be partially substituted by two or more elements selected from among Nb, Ta, Mo, and W). Meanwhile, there may be employed a dielectric composition in which Pb is partially substituted by Sr, La, or Bi, and Ti is partially substituted by Nb, Ta, Mo, or W (this dielectric composition corresponds to the aforementioned sixth dielectric composition).

The first electrode 14 or the second electrode 16 may be formed of an electrically conductive material (e.g., metallic particles, metallic film, or electrically conductive non-metallic film) other than electrically conductive non-metallic particles. Examples of the metal which may be employed include at least one metal selected from the group consisting of platinum, palladium, rhodium, gold, silver, and an alloy thereof. Particularly, from the viewpoint that high heat resistance is required during thermal treatment of a piezoelectric/electrostrictive section, platinum or an alloy predominantly containing platinum is preferably employed. Alternatively, from the viewpoint of low cost and high heat resistance, a silver-palladium alloy is preferably employed.

The openings 20 of the first electrode 14 may assume a variety of shapes other than the shapes described above in the embodiments. Specifically, the overhanging portion 26 corresponding to each of the openings 20, at which lines of electric force concentrate, may have a cross-sectional shape such that the thickness of the first electrode 14 gradually decreases toward the inner edge 26b; for example, a cross-sectional shape as shown in FIG. 2, in which the overhanging portion 26 is acutely pointed toward the center (in a thickness direction) of the first electrode 14, or a cross-sectional shape in which the overhanging portion 26 is acutely pointed toward the bottom surface of the first electrode 14. The aforementioned shape of the opening 20 may be attained by providing a projection having a sharp cross section to the inner wall of the opening, or by depositing electrically conductive fine particles onto the inner wall thereof. Alternatively, the aforementioned shape of the opening 20 may be attained by imparting a hyperboloidat profile (particularly a hyperboloidal profile such that the cross section of the opening 20 has a sharp upper end and a sharp lower end at the inner edge of the opening 20) to the inner wall of the opening 20.

Examples of the technique for forming the electrodes include the ion beam method, sputtering, vacuum evaporation, PVD, ion plating, CVD, plating, screen printing, spraying, and dipping. Of these, from the viewpoint of strong joint between the substrate and the dielectric layer, screen printing or sputtering is preferably employed.

What is claimed is:
1. An electron emitter comprising
a substrate;
an emitter section formed of a dielectric material and bonded onto a surface of the substrate; and
a first electrode provided on a top surface of the emitter section and a second electrode provided on a bottom surface of the emitter section, such that the second electrode is bonded onto the surface of the substrate and the emitter section is bonded onto the second electrode;
wherein the dielectric material forming the emitter section has an electric-field-induced strain of 0.07% or less, the electric-field-induced strain being percent deformation under application of an electric field of 4 kV/mm, as measured in a direction perpendicular to the electric field;
wherein the dielectric material comprises a dielectric composition which contains, as a primary component, a composition represented by the following formula (1):

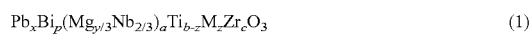
$$Pb_xBi_p(Mg_{y/3}Nb_{2/3})_aTi_{b-z}M_zZr_cO_3 \quad (1)$$

wherein x, p, and y satisfy the following relations: $0.85 \leq x \leq 1.03$, $0.02 \leq p \leq 0.1$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; M is at least one element selected from among Nb, Ta, Mo, and W; and wherein the dielectric composition contains Ni in an amount of 0.05 to 2.0 wt% as reduced to NiO and Mn in an amount of 0.05 to 1.0 wt% as reduced to $MnO_2$; and
wherein the thermal expansion coefficient of the substrate is greater than that of the emitter section.

2. An electron emitter as described in claim 1, wherein the emitter section is bonded onto a surface of the substrate.

3. An electron emitter as described in claim 2, wherein the electrodes include a first electrode provided on the top surface of the emitter section, and a second electrode provided on the bottom surface of the emitter section, the second electrode being bonded onto a surface of the substrate, and the emitter section being bonded onto the second electrode.

4. An electron emitter as described in claim 3, wherein the thermal expansion coefficient of the substrate is greater than that of the emitter section.

5. An electron emitter comprising:
a substrate;
an emitter section formed of a dielectric material and bonded onto a surface of the substrate;
a first electrode provided on a top surface of the emitter section and a second electrode provided on a bottom surface of the emitter section, such that the second electrode is bonded onto the surface of the substrate and the emitter section is bonded onto the second electrode;
wherein the dielectric material forming the emitter section has an electric-field-induced strain of 0.07% or less, the electric-field-induced strain being percent deformation under application of an electric field of 4 kV/mm, as measured in a direction perpendicular to the electric field;

wherein the dielectric material comprises a dielectric composition which contains, as a primary component, a composition represented by the following formula (2):

$$Pb_xBi_pSr_q(Mg_{y/3}Nb_{2/3})_aTi_{b-z}M_zZr_cO_3 \quad (2)$$

wherein x, p, g, and y satisfy the following relations: $0.65 \leq x \leq 1.01$, $0.02 \leq p \leq 0.1$, $0.02 \leq q \leq 0.20$, and $0.8 \leq y \leq 1.0$; a, b, and c are decimal numbers falling within a region formed by connecting the following five points (0.550, 0.425, 0.025), (0.550, 0.150, 0.300), (0.100, 0.150, 0.750), (0.100, 0.525, 0.375), and (0.375, 0.425, 0.200) in a triangular coordinate system of (a, b, c) having the following three vertexes (1, 0, 0), (0, 1, 0), and (0, 0, 1); z satisfies the following relation: $0.02 \leq z \leq 0.10$; and M is at least one element selected from among Nb, Ta, Mo, and W; and wherein the dielectric composition contains Ni in an amount of 0.05 to 2.0 wt% as reduced to NiO and Mn in an amount of 0.05 to 1.0 wt% as reduced to $MnO_2$; and wherein the thermal expansion coefficient of the substrate is greater than that of the emitter section.

6. An electron emitter comprising:
an emitter section formed of a dielectric material;
an electrode formed on or above a top surface of the emitter section; and
a substrate which supports the emitter section and the electrode, wherein
the dielectric material forming the emitter section has an electric-field-induced strain of 0.07% or less, the electric-field-induced strain being percent deformation under application of an electric field of 4 kV/mm, as measured in a direction perpendicular to the electric field; and
wherein the dielectric material comprises, as a primary component, a dielectric composition represented by the following formula (3):

$$Pb_x(Mg_{y/3}Nb_{2/3})_aTi_bZr_cO_3 \quad (3)$$

wherein x and y satisfy the following relations: $0.95 \leq x \leq 1.05$ and $0.90 \leq y \leq 1.10$; and a, b, and c are decimal numbers falling within a region formed by connecting the following five points (0.500, 0.350, 0.150), (0.500, 0.100, 0.400), (0.050, 0.100, 0.850), (0.050, 0.425, 0.525), and (0.250, 0.360, 0.390) in a triangular coordinate system of (a, b, c) having the following three vertexes (1, 0, 0), (0, 1, 0), and (0, 0, 1).

7. An electron emitter as described in claim 6, wherein the emitter section is bonded onto a surface of the substrate.

8. An electron emitter as described in claim 7, wherein the electrodes include a first electrode provided on the top surface of the emitter section, and a second electrode provided on the bottom surface of the emitter section, the second electrode being bonded onto a surface of the substrate, and the emitter section being bonded onto the second electrode.

9. An electron emitter as described in claim 8, wherein the thermal expansion coefficient of the substrate is greater than that of the emitter section.

10. An electron emitter as described in claim 6, wherein the dielectric material has, as a primary crystal phase, a pseudocubic crystal phase or a rhombohedral crystal phase.

11. An electron emitter as described in claim 10, wherein the emitter section is bonded onto a surface of the substrate.

12. An electron emitter as described in claim 11, wherein the electrodes include a first electrode provided on the top surface of the emitter section, and a second electrode provided on the bottom surface of the emitter section, the second electrode being bonded onto a surface of the substrate, and the emitter section being bonded onto the second electrode.

13. An electron emitter as described in claim 12, wherein the thermal expansion coefficient of the substrate is greater than that of the emitter section.

14. An electron emitter comprising:
an emitter section formed of a dielectric material;
an electrode formed on or above a top surface of the emitter section; and
a substrate which supports the emitter section and the electrode, wherein the dielectric material forming the emitter section has an electric-field-induced strain of 0.07% or less, the electric-field-induced strain being percent deformation under application of an electric field of 4 kV/mm, as measured in a direction perpendicular to the electric field; and
wherein the dielectric material comprises, as a primary component, a dielectric composition represented by the following formula (4):

$$Pb_{x-p}Ma_p(Mg_{y/3}Nb_{2/3})_aTi_bZr_cO_3 \quad (4)$$

wherein x and y satisfy the following relations: $0.95 \leq x \leq 1.05$ and $0.90 \leq y \leq 1.10$; and a, b, and c are decimal numbers falling within a region formed by connecting the following five points (0.500, 0.350, 0.150), (0.500, 0.100, 0.400), (0.050, 0.100, 0.850), (0.050, 0.425, 0.525), and (0.250, 0.360, 0.390) in a triangular coordinate system of (a, b, c) having the following three vertexes (1, 0, 0), (0, 1, 0), and (0, 0, 1), and Ma is at least one element selected from among Sr, La, and Bi.

15. An electron emitter as described in claim 14, wherein, when Ma in formula (4) is Sr, p falls within a range of 0.03 to 0.15.

16. An electron emitter as described in claim 15, wherein, when Ma in formula (4) is La and/or Bi, p falls within a range of 0.002 to 0.015.

17. An electron emitter as described in claim 16, wherein the emitter section is bonded onto a surface of the substrate.

18. An electron emitter as described in claim 17, wherein the electrodes include a first electrode provided on the top surface of the emitter section, and a second electrode provided on the bottom surface of the emitter section, the second electrode being bonded onto a surface of the substrate, and the emitter section being bonded onto the second electrode.

19. An electron emitter as described in claim 18, wherein the thermal expansion coefficient of the substrate is greater than that of the emitter section.

20. An electron emitter as described in claim 14, wherein the dielectric material has, as a primary crystal phase, a pseudocubic crystal phase or a rhombohedral crystal phase.

21. An electron emitter as described in claim 20, wherein, when Ma in formula (4) is Sr, p falls within a range of 0.03 to 0.15.

22. An electron emitter as described in claim 21, wherein, when Ma in formula (4) is La and/or Bi, p falls within a range of 0.002 to 0.015.

23. An electron emitter as described in claim 22, wherein the emitter section is bonded onto a surface of the substrate.

24. An electron emitter as described in claim 23, wherein the electrodes include a first electrode provided on the top surface of the emitter section, and a second electrode provided on the bottom surface of the emitter section, the second electrode being bonded onto a surface of the substrate, and the emitter section being bonded onto the second electrode.

25. An electron emitter as described in claim 24, wherein the thermal expansion coefficient of the substrate is greater than that of the emitter section.

26. An electron emitter comprising:
an emitter section formed of a dielectric material;
an electrode formed on or above a top surface of the emitter section; and
a substrate which supports the emitter section and the electrode, wherein the dielectric material forming the emitter section has an electric-field-induced strain of 0.07% or less. the electric-field-induced strain being percent deformation under application of an electric field of 4 kV/mm, as measured in a direction perpendicular to the electric field; and
wherein the dielectric material comprises, as a primary component, a dielectric composition represented by the following formula (5):

$$Pb_x(Mg_{y/3}Nb_{2/3})_aTi_{b-q}Mb_qZr_cO_3 \tag{5}$$

wherein x and y satisfy the following relations: $0.95 \leq x \leq 1.05$ and $0.90 \leq y \leq 1.10$; and a, b, and c are decimal numbers falling within a region formed by connecting the following five points (0.500, 0.350, 0.150), (0.500, 0.100, 0.400), (0.050, 0.100, 0.850), (0.050, 0.425, 0.525), and (0.250, 0.360, 0.390) in a triangular coordinate system of (a, b, c) having the following three vertexes (1, 0, 0), (0, 1, 0), and (0, 0, 1), and Mb is at least one element selected from among Nb, Ta, Mo, and W.

27. An electron emitter as described in claim 26, wherein q falls within a range of 0.10 to 0.15.

28. An electron emitter as described in claim 27, wherein the emitter section is bonded onto a surface of the substrate.

29. An electron emitter as described in claim 28, wherein the electrodes include a first electrode provided on the top surface of the emitter section, and a second electrode provided on the bottom surface of the emitter section, the second electrode being bonded onto a surface of the substrate, and the emitter section being bonded onto the second electrode.

30. An electron emitter as described in claim 29, wherein the thermal expansion coefficient of the substrate is greater than that of the emitter section.

31. An electron emitter as described in claim 26, wherein the dielectric material has, as a primary crystal phase, a pseudocubic crystal phase or a rhombohedral crystal phase.

32. An electron emitter as described in claim 31, wherein q falls within a range of 0.10 to 0.15.

33. An electron emitter as described in claim 32, wherein the emitter section is bonded onto a surface of the substrate.

34. An electron emitter as described in claim 33, wherein the electrodes include a first electrode provided on the top surface of the emitter section, and a second electrode provided on the bottom surface of the emitter section, the second electrode being bonded onto a surface of the substrate, and the emitter section being bonded onto the second electrode.

35. An electron emitter as described in claim 34, wherein the thermal expansion coefficient of the substrate is greater than that of the emitter section.

36. An electron emitter comprising:
an emitter section formed of a dielectric material;
an electrode formed on or above a top surface of the emitter section; and
a substrate which supports the emitter section and the electrode, wherein the dielectric material forming the emitter section has an electric-field-induced strain of 0.07% or less, the electric-field-induced strain being percent deformation under application of an electric field of 4 kV/mm, as measured in a direction perpendicular to the electric field; and
wherein the dielectric material comprises, as a primary component, a dielectric composition represented by the following formula (6):

$$Pb_{x-p}Ma_p(Mg_{y/3}Nb_{2/3})_aTi_{b-q}Mb_qZr_cO_3 \tag{6}$$

wherein x and y satisfy the following relations: $0.95 \leq x \leq 1.05$ and $0.90 \leq y \leq 1.10$; and a, b, and c are decimal numbers falling within a region formed by connecting the following five points (0.500, 0.350, 0.150), (0.500, 0.100, 0.400), (0.050, 0.100, 0.850), (0.050, 0.425, 0.525), and (0.250, 0.360, 0.390) in a triangular coordinate system of (a, b, c) having the following three vertexes (1, 0, 0), (0, 1, 0), and (0, 0, 1); Ma is at least one element selected from among Sr, La, and Bi; and Mb is at least one element selected from among Nb, Ta, Mo, and W.

37. An electron emitter as described in claim 36, wherein, when Ma in formula (6) is Sr, p falls within a range of 0.03 to 0.15.

38. An electron emitter as described in claim 37, wherein, when Ma in formula (6) is La and/or Bi, p falls within a range of 0.002 to 0.015.

39. An electron emitter as described in claim 38, wherein q falls within a range of 0.01 to 0.15.

40. An electron emitter as described in claim 39, wherein the emitter section is bonded onto a surface of the substrate.

41. An electron emitter as described in claim 40, wherein the electrodes include a first electrode provided on the top surface of the emitter section, and a second electrode provided on the bottom surface of the emitter section, the second electrode being bonded onto a surface of the substrate, and the emitter section being bonded onto the second electrode.

42. An electron emitter as described in claim 41, wherein the thermal expansion coefficient of the substrate is greater than that of the emitter section.

43. An electron emitter as described in claim 36, wherein the dielectric material has, as a primary crystal phase, a pseudocubic crystal phase or a rhombohedral crystal phase.

44. An electron emitter as described in claim 43, wherein, when Ma in formula (6) is Sr, p falls within a range of 0.03 to 0.15.

45. An electron emitter as described in claim 44, wherein, when Ma in formula (6) is La and/or Bi, p falls within a range of 0.002 to 0.015.

46. An electron emitter as described in claim 45, wherein q falls within a range of 0.01 to 0.15.

47. An electron emitter as described in claim 46, wherein the emitter section is bonded onto a surface of the substrate.

48. An electron emitter as described in claim 47, wherein the electrodes include a first electrode provided on the top surface of the emitter sections and a second electrode provided on the bottom surface of the emitter section, the second electrode being bonded onto a surface of the substrate, and the emitter section being bonded onto the second electrode.

49. An electron emitter as described in claim 48, wherein the thermal expansion coefficient of the substrate is greater than that of the emitter section.

* * * * *